(12) United States Patent
Williams et al.

(10) Patent No.: US 6,610,386 B2
(45) Date of Patent: *Aug. 26, 2003

(54) TRANSFERABLE SUPPORT FOR APPLYING DATA TO AN OBJECT

(75) Inventors: Kevin W. Williams, Rochester, NY (US); Huijuan D. Chen, Webster, NY (US); W. S. Gaugh, Webster, NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 49 days.

This patent is subject to a terminal disclaimer.

(21) Appl. No.: 09/224,606

(22) Filed: Dec. 31, 1998

(65) Prior Publication Data

US 2001/0031340 A1 Oct. 18, 2001

(51) Int. Cl.[7] .................................................. B32B 3/00
(52) U.S. Cl. ........................... 428/195; 283/93; 283/113
(58) Field of Search ................................ 428/195, 913, 428/914; 283/93, 113, 109, 91, 86

(56) References Cited

U.S. PATENT DOCUMENTS

| 5,093,147 A | 3/1992 | Andrus et al. | |
|---|---|---|---|
| 5,135,569 A | 8/1992 | Mathias | |
| 5,286,286 A | * 2/1994 | Winnik et al. | 106/21 |
| 5,401,561 A | 3/1995 | Fisun et al. | |
| 5,407,718 A | * 4/1995 | Popat et al. | 428/42 |
| 5,409,797 A | 4/1995 | Hosoi et al. | |
| 5,502,304 A | 3/1996 | Berson et al. | |
| 5,532,104 A | 7/1996 | Goto | |
| 5,542,971 A | 8/1996 | Auslander et al. | |
| 5,549,952 A | 8/1996 | Arai et al. | |
| 5,554,842 A | 9/1996 | Connell et al. | |
| 5,599,649 A | 2/1997 | Shinkai et al. | |
| 5,605,738 A | 2/1997 | McGinness et al. | |
| 5,616,447 A | 4/1997 | Arioka | |
| 5,616,450 A | 4/1997 | Arai et al. | |
| 5,629,512 A | 5/1997 | Haga | |
| 5,683,855 A | 11/1997 | Shinkai et al. | |
| 5,700,623 A | * 12/1997 | Anderson et al. | 430/256 |
| 5,995,193 A | * 11/1999 | Stephany et al. | 355/31 |

FOREIGN PATENT DOCUMENTS

| DE | 197 47 000 C1 | 12/1998 |
|---|---|---|
| GB | 2 299 544 A | 10/1996 |

* cited by examiner

*Primary Examiner*—Bruce H. Hess
*Assistant Examiner*—Michael Grendzynski
(74) *Attorney, Agent, or Firm*—Edith A. Rice; Lynne M. Blank

(57) ABSTRACT

This invention comprises a transferable support comprising a substantially flat sheet having on a surface thereof encoded data in the form of dot code or two-dimensional bar code wherein the data is capable of being read by a sensor. The invention also comprises object having affixed to a surface thereof a support comprising a substantially flat sheet having on a surface thereof encoded data in the form of dot code or two-dimensional bar code wherein the data is capable of being read by an sensor.

27 Claims, 2 Drawing Sheets

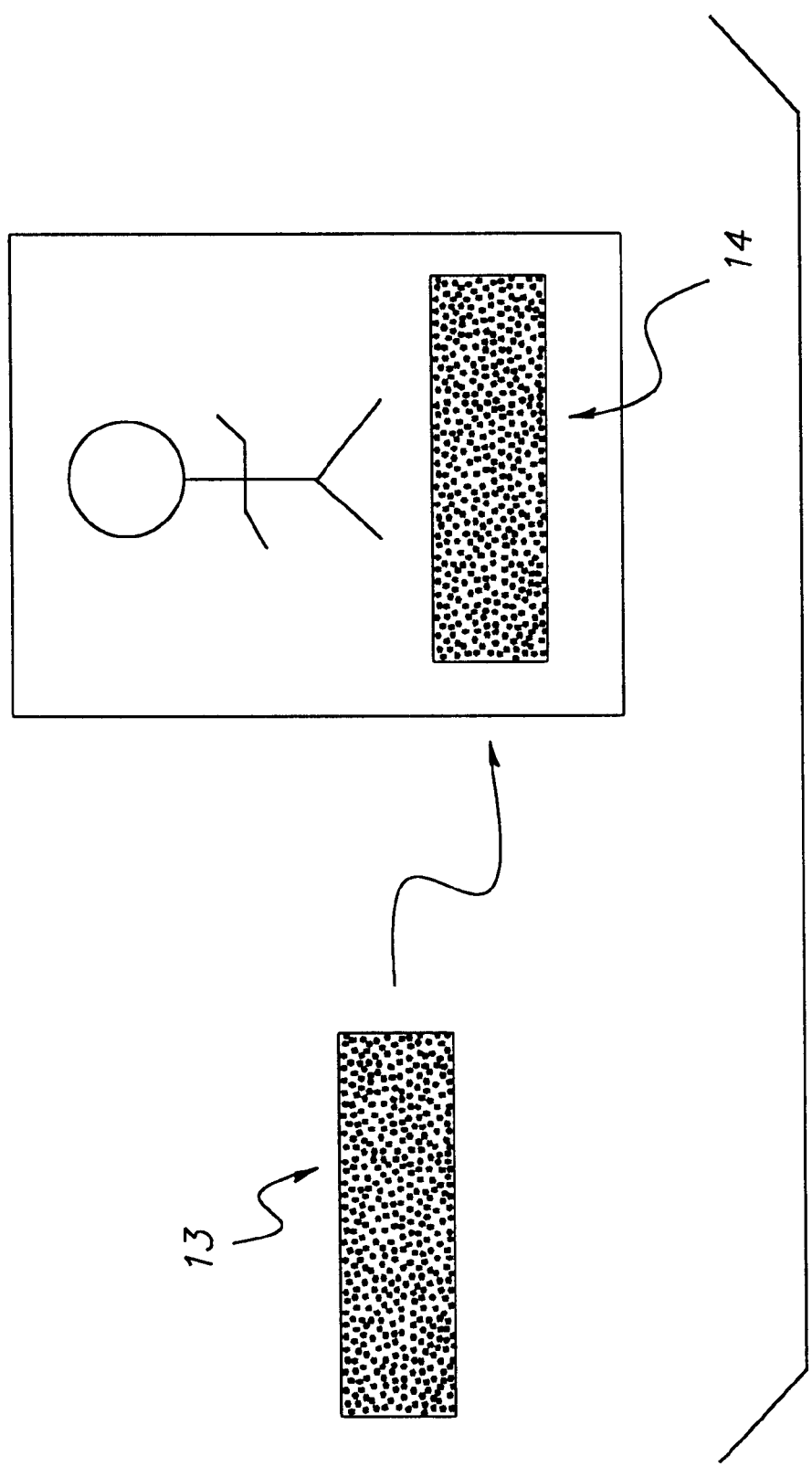

TRANSFERABLE SUPPORT FOR APPLYING DATA TO AN OBJECT

FIELD OF THE INVENTION

This invention relates to a transferable intermediate support having encoded data on a surface thereof, an object having said support affixed thereto, a method of preparing the support and a method of preparing the object.

BACKGROUND OF THE INVENTION

There exists a need of encoding data on objects including but not limited to photographic prints. On photographic prints data may contain image capture information such as exposure conditions during picture taking or a time and date stamp. Historically storage of this data has been placed on the non-image side of the print. This is done to avoid two major problems. First, the materials needed to carry the non-image data are visible and would thus degrade the original image. For example magnetic materials are useful for the encoding of data on the backside and borders of photographic films. However when the amount of data is small, such as time or date characters, it may be printed on the image side of a photograph. To some even this amount of data on the surface of a print is objectionable. Large data files are prohibitive. The second reason for backside encoding is compatibility of materials. Any materials that carry the non-image data need be optimized to avoid chemical interactions with existing image chemistry. Encoding data on the backside the print will prevent most interactions of this type.

In addition to photographic prints there exists a need to encode data on other objects. These include but are not limited to walls, book covers and pane glass. For some of these objects the problems associated with photographic prints is less important. The overwhelming problem is the method or means of encoding these objects. That is, it is obvious that jet-printing on a photographic print is the preferred means for encoding the data. However jet-printing on a wall or hard book cover is not readily accomplished.

The encoding of data on an object is known. In the monetary and copyrighting industries invisible encoding of indices and markings is well patented See, for example, U.S. Pat. No. 5,683,855. In postal applications many methods and materials have been described for marking of postal pieces See for example, U.S. Pat. Nos. 5,093,147, 5,554,842, 5,542,971, 5,502,304.

The prior art is plentiful of direct printing methods for encoding objects with data. See, for example U.S. Pat. Nos. 5,401,561, 5,629,512, 5,135,569, 5,409,797, and 5,599,649. The direct printing methods commonly described are thermal dye transfer, ink jet and AgX printing.

There exists much art involving thermal dye transfer for the encoding of objects such as mail pieces and card stock. The art describes the transfer of material to a receiver to "form" the mark "post printing". The prior art is disadvantaged in that it provides no means of marking objects other than the flat still media that was co-optimized to receive the printing material. The prior art describes only objects that can be easily sent through a printer. This problem is addressed in U.S. Pat. No. 5,532,104 which discloses first jet-printing a white patch over the existing image and then printing the data file in this white area. The problem with this method is that the information under this patch area is lost, in other words the original image was degraded. Obviously the amount of data that can be recorded is limited because only a small area of the original image can be rendered non-viewable. Large data blocks are prohibitive.

U.S. Pat. Nos. 5,549,952, 5,616,450 and 5,616,447 describe jet printing onto optical disk labels). These patents relate to the printing of a picture or logo onto the surface of an optical disk for aesthetic, artistic or advertisement purposes.

PROBLEM TO BE SOLVED BY THE INVENTION

As described above, there is a need to store encoded data on numerous objects. However, the methods described in the prior art generally do not permit applying encoded data onto objects without obscuring all or part of the surface of the object, which in the case of a photographic print results in obscuring the image. Further, there is a need to apply encoded data to objects that are difficult or impossible to put through a conventional printer.

SUMMARY OF THE INVENTION

In accordance with one aspect of the invention, there is provided a method of storing encoded data on an intermediate transferable support as a two dimensional coding, such as a dot code or two-dimensional bar code In accordance with another aspect of this invention, the intermediate transferable support is capable of being transferred with the encoding in its entirety to the final object.

In accordance with another aspect of the invention, there is provided materials that can be used to store the two dimensional data on said transferable support. In a preferred embodiment the materials are invisible to the naked eye, and does not interfere with the normal observation of the object under normal viewing conditions. In another embodiment the encoded data is visible but placed in a location unobtrusive to other images or data. The intermediate transferable support may or may not be transparent depending on its usage and or the object needed to be encoded. In accordance with another aspect of this invention, the object to be encoded is capable of receiving an intermediate support.

A further aspect of this invention comprises a transferable support comprising a substantially flat sheet having on a surface thereof encoded data in the form of dot code or two-dimensional bar code wherein the data is capable of being read by a sensor.

Still another aspect of this invention comprises a method of preparing a support which comprises applying to substantially flat sheet, encoded data comprising a material capable of being detected by a sensor.

Yet another aspect of this invention comprises an object having affixed to a surface thereof a support comprising a substantially flat sheet having on a surface thereof encoded data in the form of dot code or two-dimensional bar code wherein the data is capable of being read by an sensor.

An additional aspect of this invention comprises a method of applying data to an object which comprises applying to the surface of the object a support comprising comprising a substantially flat sheet having on a surface thereof encoded data in the form of dot code or two-dimensional bar code which is capable of being read by an sensor.

BRIEF DESCRIPTION OF THE DRAWINGS

FIG. 3 depicts a dot pattern (in its entirety) which has been removed from an intermediate support and its subsequent application to a final article.

ADVANTAGEOUS EFFECT OF THE INVENTION

Figure 1A:
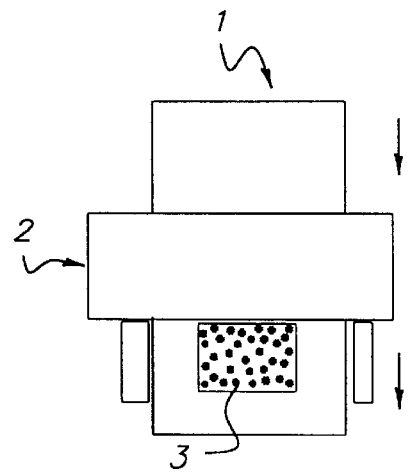
FIG. 1A depicts normal desktop jet-printing of dot pattern on a blank intermediate transferable support.

This invention provides a support, object and methods for encoding data on a photographic print, a wall, a bound book, an audio album cover or a transparent inter-leaf in a photograph album. An additional advantage is that the materials printed to form the data need not be optimized to minimize negative interaction with existing materials already contained in the final object.

DETAILED DESCRIPTION OF THE INVENTION

This invention comprises a means to apply encoded data to virtually any object. Illustrative examples include walls, pane glass, pre-fabricated books and book covers, photographic prints and films, computer screens, wood and plastic objects, a ceramic object, such as coffee mugs, ceramic cookware, and the like, and photographic album interleaf materials, etc.

The intermediate transferable support can be any flat sheet, such as paper including plain paper, glossy inkjet paper, thermal transfer receiver paper, conventional photographic paper, or transparent sheets, sticker prints, and the like. The transferable support with the encoded data can be transferred in its entirety to a final object.

The material used for the encoded data should absorb little, if any, light in the visible region of the electromagnetic spectrum (i.e. in the range of about 400 nm to about 700 nm.

The material used for the encoded data should absorb little, if any, light in the visible region of the electromagnetic spectrum (i.e. in the range of about 400 nm to about 700 nm.

In preferred embodiments of the invention the material absorbs or emits in the infrared (IR) region of the spectrum, in particular the light absorbs light between 800 nm and 1200 nm. Preferable the material absorbs light above about 850 nm.

In certain embodiments of the invention, the material absorbs or emits in the ultraviolet (UV) portion of the spectrum, i.e., wavelengths below about 400 nm.

In certain embodiments of the invention, the invisible material is a luminescent material. A luminescent material is defined as any material which absorbs light and then emits light at another region of the electromagnetic spectrum which may be detected by some sensor device. While most luminescent materials absorb light at a particular wavelength and emit light at longer wavelength the materials of this invention are not limited to such restrictions. In fact materials where the opposite is true would also be useful for the purpose of this invention and such materials will be herein referred to a up-converters or up-conversion materials (for a review of system upconverters see *Indian J. Of Pure and Appl. Phys.*, 33, 169–178, (1995). The invisible, luminescent materials can be either dyes, pigment, or any other material possessing the desired absorption properties. And the fluorescent dyes can absorb either in the UV, visible or in the infrared region of the electromagnetic spectrum at a concentration such that the data can be detected by a sensor.

The term "invisible materials" is used herein to describe materials that absorb little, in any light in the visible region of the spectrum, but absorb in the IR or UV regions. In the event the material absorbs some light in the visible region, the material should be used at relatively low concentration so that the material can be detected by the sensor.

The following materials are useful in the practice of this invention

Material 1 contains a list of typical UV or visible absorbing materials which upon illumination with an appropriate light source, fluoresce in the visible or near IR region of the electromagnetic spectrum.

Material 1

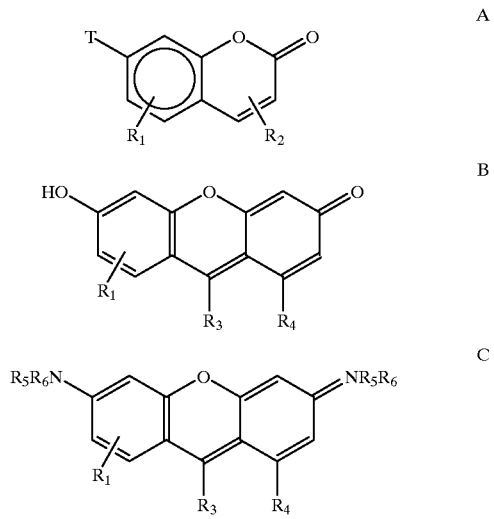

Compounds A, B, C are general representations of coumarins, fluoresceins and rhodamines respectively. Dyes of the classes disclosed above have been reviewed for there use in biological applications (*Appl. Phys.* B56, 385 –390 (1993). These molecules are highly luminescent and maybe useful for the present invention. R1 represents any group including a hydrogen, substituted alkyl (per-halogenated, branched, saturated or unsaturated), halogen atoms (Cl, Br, I), any aryl group (phenyl, naphthyl, pyrrlyl, thienyl, furyl, etc.) or acyl (amido, ester, or carboxy), any sulfonic acid groups or derivatives of sulfonic acids (sulfonamides, sulfuryl halides, nitro, or substituted ether group. In general R1 could be any group that allows these compounds to remain luminescent. T represents any of the following groups, OH, substituted or unsubstituted amino, a substituted amino group where the amino is a member of any ring, fused or otherwise. R2 can be any substituted alkyl, aryl or acyl groups (perfluoronated alkyl groups are particularly useful in this position). R3 can be hydrogen, or substituted alkyl. When R3 is aryl or CN these dyes are particularly useful for the present invention, these dyes absorb in the IR region of the electromagnetic spectrum. R4 can be any substituted alkyl, aryl or acyl groups (perfluoronated alkyl groups are particularly useful in this position). R5 and R6 can be hydrogen atoms or any combination of alkyl groups. R5 and R6 can represent groups necessary to form any ring (e.g. pyrrole, pyrimidine, morpholine or thiomorpholine). R5 and R6 may be part of a bicyclic ring system, fused onto the phenyl ring as shown in the general structure below.

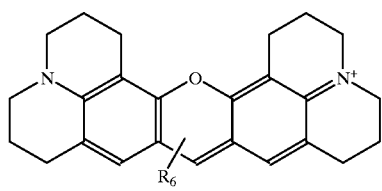

D

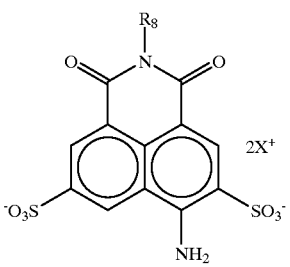

H

A reference describing the use of fused molecules of this type have been reviewed (*Tetrahedron*, Vol. 34, No.38, 6013–6016, (1993)). Additionally the impact of annulation on absorption and fluorescence characteristics of related materials is has also been described (*J. Chem. Soc., Perkin Trans.* 2, 853–856, (1996)).

The commercial Lucifer yellow dyes were H where R8 is any alkyl and $X^+$ represents a cation, necessary to balance the negative charge is useful for this invention. The merits of this type of molecule and its luminescent properties have been disclosed (U.S. Pat. No. 4,891,351) for use in thermal transfer applications.

Material 2

Material 3

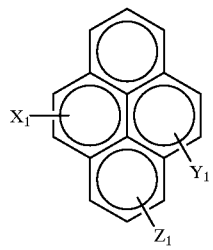

E

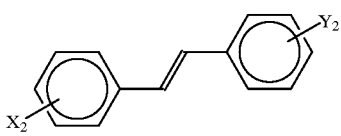

I

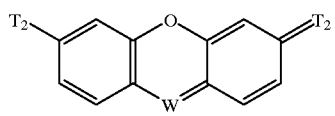

F

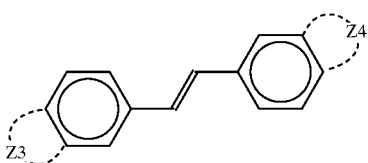

J

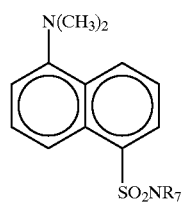

G

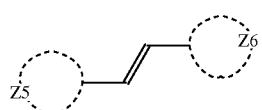

K

Aromatics (polycyclic aromatics especially) such as shown in Material 2 are useful for this invention. X1, Y1, Z1 can be any groups which allow these compounds to be luminescent. In F, T2 represents any substituted or unsubstituted amino or substituted or unsubstituted oxygen and W can be carbon, or nitrogen. These compounds are particularly useful when X1, Y1 or Z1 are donor and acceptor groups on the same molecule as depicted on the so called "dansyl" molecule depicted as compound G. Anthracenes, pyrenes and their benzo derivatives are examples of fused aromatics. These materials are can be used individually or in combination with multiple components to form complexes which are luminescent. Sulfonated polyaromatics are particularly useful in water-based ink formulations. Lucifer yellow (H) dyes are often soluble in water and are comparatively stable and have hence been useful as biological stains (*Nature*, 292, 17–21, (1981)).

The stilbene class of dyes (Material 3) are useful for the present invention. These dyes are very commonly used commercially as optical brightners for paper stock (see Colourage 47–52, (1995) for an excellent review of fluorescent stilbene type lumiphores). For this invention X2 and/or Y2 can be any substituent or group that promotes absorption of this chromophore in the UV or short wavelength visible and subsequently emits light in the visible. Examples include but are not limited to halogens (Cl, I, etc.), alkyl (methyl, ethyl, butyl, iso-amyl, etc.) which may be used to increase organic solubility, sulfonic acid and its derivatives which may be useful for increasing water solubility, carboxylic acid groups which be used for solubility but also as a position of oligomerization or polymerization. Also useful are amine derive substituents, which can be used to append groups for solubility purposes and polymerization but additionally may be used to manipulate the absorption characteristics. Stilbenes where X2 and Y2 are comprised of groups which allow for a donor and acceptor molecule in the same molecule are particularly useful for this purpose. In structures J and K, Z3, Z4, Z5 and Z6 represent any atoms that can be used to form a ring of any size or substitution with the proviso that the material is still luminescent. For structure K, it is noteworthy that Z5 and Z6 represent heteroaromatic nuclei, such as benzoxazolium, benzothiazolium, benzimdazolium, or their naphthalene derivatives, which make these compounds highly fluorescent.

Material 4

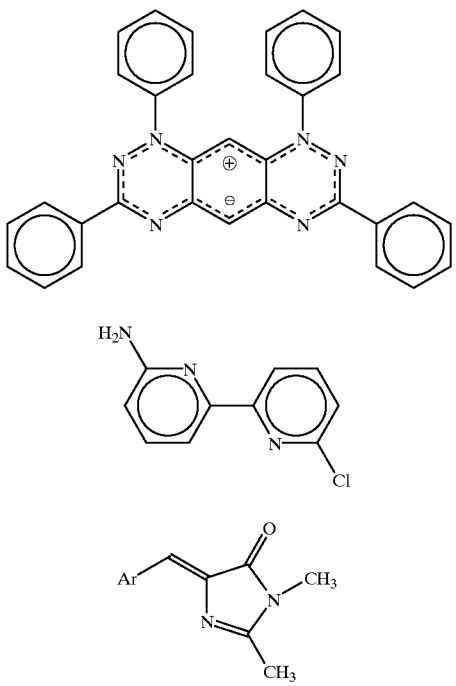

Highly fluorescent amine heterocycles have recently been described in the academic literature and would be particularly useful for this invention. Material 4 contains several of the more recent discovered compounds described in the academic literature. The novel and highly fluorescent (φ~0.33) tetraphenylhexaazaanthracene (TPHA, L) is atmosphere stable and thermally stable up to 400° C. (see *J. Am. Chem. Soc.* 120, 2989–2990, (1998) and included references). Such properties would be extremely useful for encodement of data where archival stability expects to be an important issue. The diaminobipyridine compound M, was found to be highly fluorescent (φ~0.8) and have a substantial Stokes' shift ($\Delta\lambda_{em-abs}$~100 nm), which are optical properties, that qualify these chromophores as preferred for this invention (for a literature ref. described (*J. Chem. Soc., Perkin Trans.* 2, 613–617, (1996)). The benzimidazalones N are also highly fluorescent (φ~0.8) when incorporated into certain environments (see *Tetahedron Letters*, 39, 5239–5242, (1998) for a recent article describing the synthesis of similar compounds). The aromatic group (Ar) can be a simple phenyl or more intricate heteroaromatic groups (imidazolo, benzoxazolo, indole, etc.). Material 5 contains another general class of useful dyes for the application described in the present invention.

Material 5

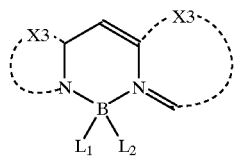

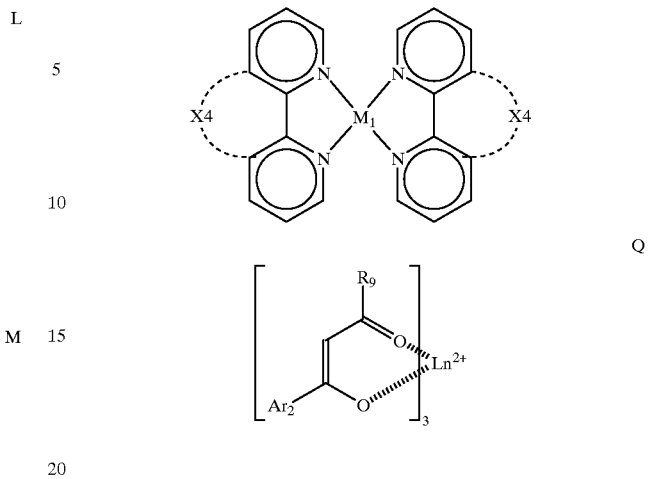

Compounds O, P, and Q represent several classes of metallized dyes which are included in the scope of the present invention. Boron complexes such as compound (O) are very fluorescent, stable and easily synthesized from commercially available materials (a reference describing the merits of fluorescent boron complexes for biological usage see *J. Am. Chem. Soc.* 116, 7801–7803, (1994). X3 represents atoms necessary to form an aromatic or heteroaromatic ring, L1 and/or L2 could be halogens, ether or any other ligand which commonly has an affinity for boron metal. Bipyridyl metal complexes such as (P) are described in the academic literature as being luminescent (for a review of the general use of luminescent materials in sensors see *Chem. Rev.*, 97, 1515–1566, (1997)). Due to the described optical properties is highly conceivable that such complexes would be useful for the present invention. X3 could be an atom which form either an aromatic fused ring forming a phenanthroline complex or saturated ring which could restrict from rotation the bipyridyl functions. M1 represents any metal that would provide a luminescent complex (e.g. Ru or Re) or a metal which when complexed with the bipyridyl ligand quenches luminescence in a photographic manner. Compound (Q) represents the lanthanide complexes which have been described by others to be useful for thermal transfer imaging (U.S. Pat. No. 5,006,503). Lanthanide metal complex dyes have UV absorbance and typically large Stokes' shifts.

Material 6

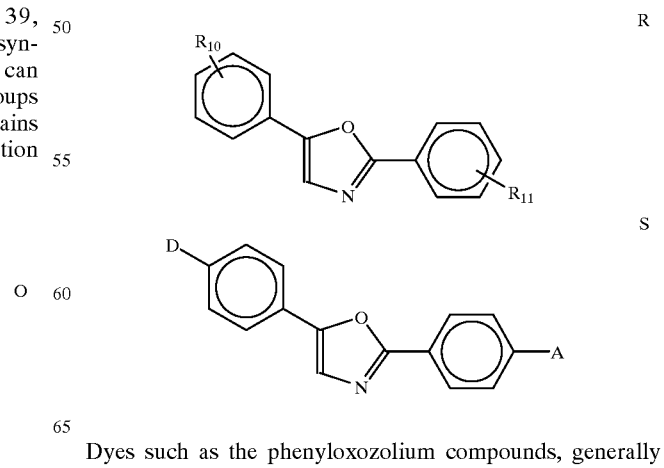

Dyes such as the phenyloxozolium compounds, generally depicted as in Material 6, are very fluorescent and have the added feature that the fluorescent signal is long lived (see *Photochemistry and Photobiology*, 66 (4), 424–431 ,(1997)). When the R-groups represent donor (D) and acceptor (A) groups on the same molecule as depicted in structure S, then these materials possess superior luminescent properties. In fact the high fluorescence quantum yields ($\phi_F$~0.91) are obtained in certain solvent environments (see previous reference for an example).

The materials discussed in the previous examples absorbed light in either the UV or visible region of the electromagnetic spectrum. These materials have several advantages for use in the application described in the present invention. Often the materials are atmospherically stable, they are commercially available since they have been used extensively in non-photographic applications and finally good optical properties can been had (e.g. large Stokes' shifts, high fluorescence quantum yield ($\phi_F$, long excited state lifetimes τ. etc.). The materials in the next serious of examples absorb light in the IR and for the most part emit further into the IR. Since these materials emit beyond the absorption of the other possible colorants on articles, IR luminescent materials can be detected easier from background colorants. The next several materials are typical IR materials useful for this invention.

Material 8

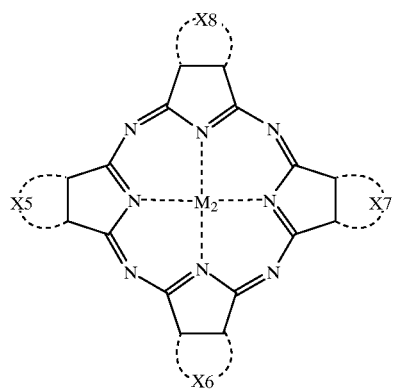

Material 8 contains a general structure depicting a phthalocyanine or naphthalocyanine compound. Phthalocyanines are well known in the photographic industry (for a historic reference for these compounds and their basic luminescence properties see *Molecular Luminescence: An International Conference.*, New York, W. A. Benjamin, 295–307, (1969)). They have been used in electroconductive applications, as absorber dyes for photothermographic printing and as colorants in inks (for a general reference see chapters 5 and 9 in *Infared Absorbing dyes: Topics in Applied Chemistry.*, Edited by Masaru Matsuoka, New York, Plenum Press, 1990. Several well known properties of the phthalocyanines and their extended analogs, naphthalocyanines, have high fluorescence efficiencies (see *Dyes and Pigments*, 11, 77–80, (1989)) for certain types and superior thermal (see *Aust. J. Chem.*, 27, 7–19, (1974)) and light stability (for a recent disclosure see *Dyes and Pigments*, 35, 261–267, (1997). These properties make these materials ideal for storage of large data amounts for extended periods as described in this invention. Compound T depicts a general structure of a phthalocyanine or naphthalocyanine. X5, X6, X7 and X8 represent atoms necessary to form a ring. The ring is often aromatic or heteroaromatic such as phenyl, 1,2-fused naphthyl, 1,8-fused naphthyl or larger fused polyaromatics such as fluoroanthrocyanine. The rings may be substituted in any way in the spirit of this invention provided that the materials is still luminescent. In fact differential substitution can be used to attenuate the physical properties (e.g. light stability and solubility) or enhance the optical properties of a material (e.g. Fluorescence efficiency or Stokes' shift). The rings may contain functional groups through which oligomerization can be accomplished. The (X5–8)-groups may be the same or different leading to symmetrical or unsymmetrical materials respectively. The metal atom (M2) can be any metal with the proviso that it allows for luminescent materials. The metal (M2) can also represent two hydrogen atoms, these materials are usually referred to as "non-metallized" (na)phthalocyanines. Some metals can possess additional "axial" ligands (e.g. Al and Si) which are useful for appending additional functional groups to alter the properties of the dyes. Additionally these groups prevent chromophore aggregation which may perturb the luminescent properties of the chromophores. These ligands also useful points of attachment for oligerimerize these materials (see *Thin Solid Films*, 299, 63–66, (1997)) or to create dendrimers (see *Angew. Chem. Int. Ed.* 37 (8), (1092–1094), (1998). A related class of materials is depicted in material 9. Compound U is classified as a "sub"-phthalocyanine (see for a lead article on the synthesis and properties of these materials *J. Am. Chem. Soc.* 118, 2746–2747, (1996)). As for the phthalocyanines these materials are very fluorescent (φ~0.80). In fact these materials are useful in preparing unsymmetrical phthalocyanines. The sub-naphthalocyanines with the proper substitution can absorb in the near IR and have Stokes' shift comparable if not larger than the analogous naphthalocyanines.

Material 9

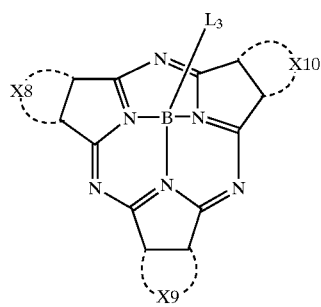

The group L2, like similar "axial substituents on phthalocyanines these groups may be useful for modifying the properties of the materials. Also like phthalocyanines these groups are expected to prevent chromophore aggregation which may perturb the luminescent properties of the chromophores.

Material 10

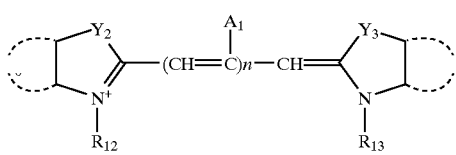

V

Cyanines such as depicted in structure V are luminescent and useful for this invention. In the above structure n could be 0 or any integer (e.g. 1–4) and A is a group that is appended to the central chain carbon or atom. The group A, can be any alkyl, aromatic or heteroaromatic group. A can be any group with the proviso that the dye is still luminescent. Y2 and Y3 could be independently one of the following groups: N, O, S, Se, or Te, additional C(alkyl)2 which forms the indole nucleus, well recognized by anyone skilled in the art as an indole ring. Additionally when Y2 or Y3 is nitrogen then it is substituted with an appropriate group, forming what is recognizable as an imidazolium ring by any skilled in the art. Z6 and Z7 represent atoms necessary for forming a saturated aromatic or unsaturated non-aromatic ring. The ring so formed could be phenyl, naphthyl or any other fused aromatic. Likewise the ring could be any aromatic or non-aromatic heteroatom containing ring (e.g. pyridyl, quinoyl, etc.) R12 or R13 represent any of the possible nitrogen substituents well known by any skilled in the art. For example R12 or R13 may be independently saturated substituted or unsubstituted alkyl (e.g. methyl, ethyl, heptafluorobutyl, etc.) or non-saturated alkyl (vinyl, allelic, acetylinic). R12 and R13 may also be charged groups (cationic, anionic or both). In cases where the R12 and or R13 are charged and a net charge exists on the dye, it is obvious to anyone skilled in the art, that there exist a combination of counterions to balance the charge. For example if R12 and R13 are both sulfoalkyl the net charge on the chromophore may be −1 and hence would be charge balanced with an appropriate cation (e.g. Na+, K+, triethylammonium, etc.) Likewise if R12 and R13 are simple uncharged alkyl groups such methyl, then the dye may have a net +1 charge and hence have to be charge balanced with a negative anion (e.g. perfluorobutyrate, I-, BF4-, etc.). R12 and R13 could be groups necessary to incorporate the material in an oligomer or polymer. The dye may be incorporated into the polymer backbone or be pendant. Additionally the polymer may incorporate this material by non-covalent forces (charge—charge interactions, encapsulation, etc.). Long chain cyanines are often bridged. It is known that such bridging Material 11

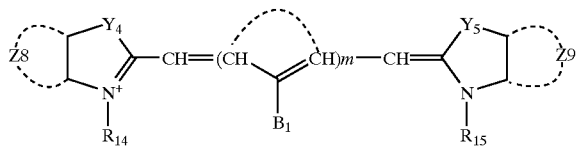

W has a stabilizing effect on cyanine dyes and stability is a preferred embodiment here such dyes are preferred. The bridge could be any saturated structure of any size, preferably 5, 6, 7 membered. Such ring may be fuctionalized with the usual groups alkyl (e.g. methyl, t-butyl) carboxlic acid (and its derivatives), sulfonic acids (and its derivatives) halogen, aromatic and heteroaromatic. Group B could be the usual chain substituents, halogen (preferable Cl), phenyl, heteroaryl (e.g. furyl, thienyl, etc.), ethereal (e.g. ethoxy, phenoxy, benzyloxy), or barbiturate, mercapto (e.g. thiophenoxy, thiobenzyloxy, etc.), amino (e.g. anilino, etc.). B1 could represent a point of attachment for oligomerization or polymerization. It is noted that m represents an integer from 1–3 as dyes containing such bridging are well known in the art. Z groups represent atoms necessary to for fused rings. Each Z group represents any ring which allows these dyes to be luminescent. Y4 and Y5 represent atoms necessary to form the typical dye nuclei and could anything which allows the material to be luminescent. Material 12 illustrates another useful feature. That is X1 and X2 represent the atoms necessary to for a ring from the nitrogen atom of the hetero-nucleus to the chromophore chain. Typically forming a 5-member or six member ring. Ridigization of chromophores as depicted in materials 11 and 12 is known to enhance the luminescence.

Material 12

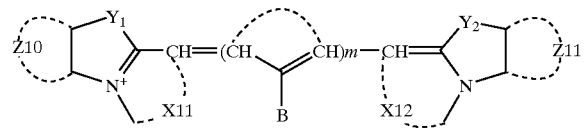

X

Another well known class of luminescent materials is depicted in material 13. This class of materials are known as squaraine dyes or squarylium dyes. The use of organic solubilized squaraines for antihalation protection in IR sensitive AgX applications has been described (WO 96/35142). These dyes have been also been disclosed for use as IR absorbing elements in laser addressable imaging elements (EP 0764877A1).

Material 13

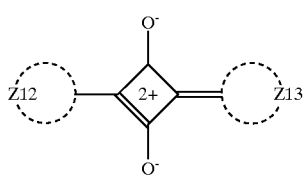

W

Squaraine dyes are well known to have good thermal stability, another preferred feature for any material of this invention. Z12 and Z13 independently represent any substituted aromatic or heteroaromatic nucleus. Typical aromatic nuclei include phenyl, naphthyl, pyrrylium, thiopyrrylium, or any other group which provides that the material is luminescent or absorbs a wavelength in the IR or UV region of the spectrum. Heteroaromatic rings could be but not limited to benzoxazolium, benthiazolium, quinoline or any other group which provided that the material is luminescent. It is also noteworthy to mention that the center ring does not have to feature the negative charge oxygen (O—). In fact squaraines where the central chain atom is either carbon (U.S. Pat. No. 5,227,499) and nitrogen (U.S. Pat. No. 5,227,498) have been disclosed.

Another class of IR materials are illustrated in material 14 (for a reference describing the merits of using squaraine and croconium dyes in optical recording materials see *Sensors and Actuators B,* 38–39, 202–206 (1997) and *Sensors and Actuators B,* 38–39, 252–255 (1997). The croconium dyes like squaraines are well known to have good thermal stability, another preferred feature for any material of this invention. Z12 and Z13 indenpently represent any substituted aromatic or heteroaromatic nucleus. Typical aromatic nuclei include phenyl, naphthyl, any other group which provided that the material is luminescent, pyrrylium, thiopyrrylium. Heteoaromatic includes but not limited to benzoxazolium, benthiazolium, quinoline or any other group which provided that the material is luminescent.

Material 14

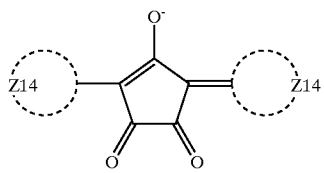

wherein Z14 represents any substituted aromatic or heteroaromatic nucleus.

The materials described hence forth have intrinsic luminescent properties. However materials are not intrinsically luminescent but become so after an activation step can be used in the practice of this invention. The art is plentiful of examples of materials which fit this description. Materials 15, 16, and 17 represent three of the more common materials. Other materials exist and respective methods for generating them are known. Generally these materials are considered useful for this invention if a luminescent material is the result of an activation step. Some of the most common activating steps include the use of light (the materials are referred to as "photochromic"), a chemical (usually some oxidant to oxidize a "leuco" dye), heat (e.g. thermographic), a reaction with another agent (e.g. a coupler with a photographic developer) or by non-covalent interaction between two or more agents often referred to as "host-guest or molecular recognition (e.g. metal complexation, chromophore—chromophore interactions, coupler-developer reaction. etc.).

Material 15

Equation 1

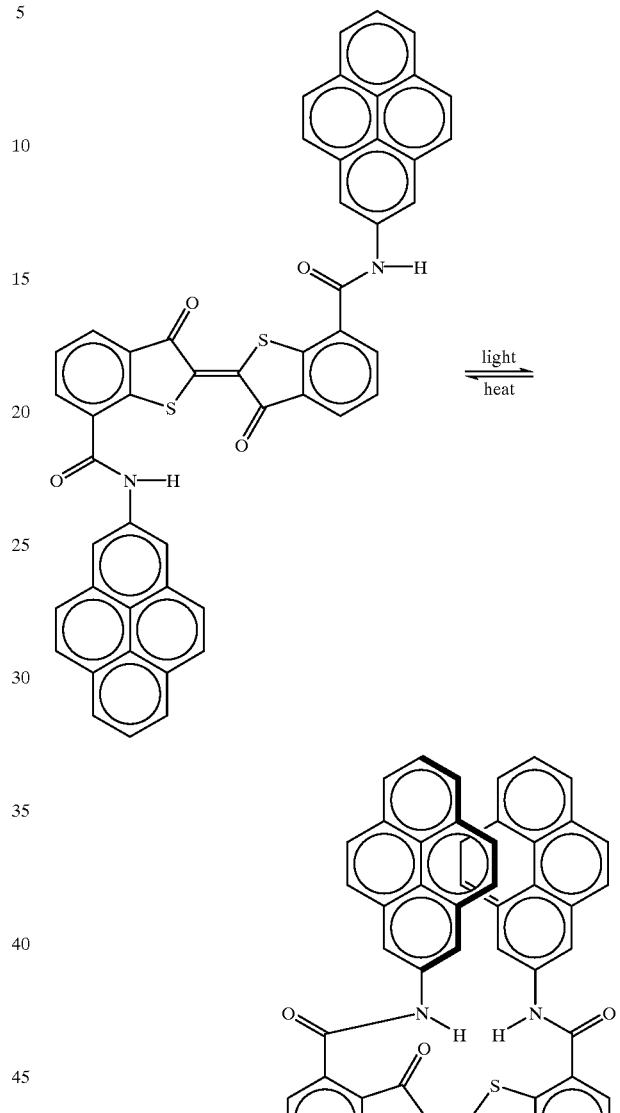

Equation 1 depicts the photo-conversion of a material into a material with additional "eximer fluorescence" (*J. Chem. Soc. Chem. Commun.,* 591 (1992)). The process uses light to generate a new material which could be easily a luminescent material. In the above example a second point relevant to this patent is illustrated, that is, that a second stimulus (heat in the above example) may be used to reverse a material from a colored (or luminescent) state to a colorless (or non-luminescent) state. It is in the spirit of the invention that the encodement may not necessarily be due to the luminescent material directly but may be due to its removal from a luminescent background.

Equation 2

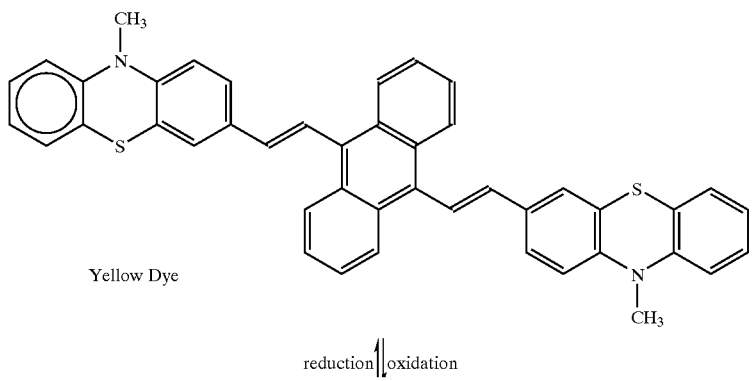

Yellow Dye reduction ↕ oxidation

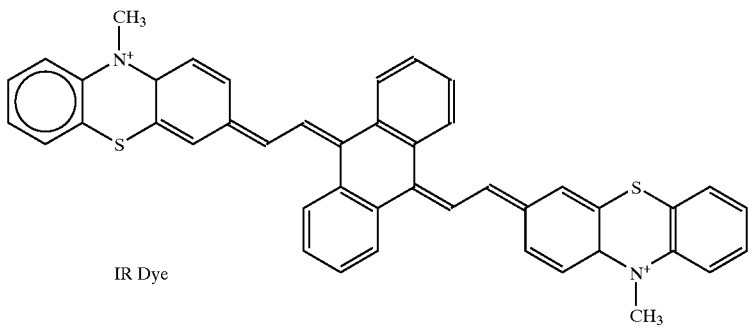

IR Dye

Equation 2 shows another type of activation of a material (*Angew. Chem. Int. Ed. Engl.,* 36 (24),2817–2819, (1997)). A material (or its luminescence) may be "turned on" or "off" with redox chemistry. The oxidation may come about by simple post-coating reaction with a molecular oxidant or a more complicated photographic process (generation of an oxidized color developer). Equation 2 also illustrates the possibility of a reversible system.

Equation 3 illustrates yet another possible way of generating a luminescent compound. This process involves the selective complexation ("molecular recognition" or "host-guest") of one non-luminescent component (dye-ligand) by another ($Cu^{2+}$ ion) to in this case convert the material to a luminescent material (*Angew. Chem. Int. Ed.* 37, 772–773, (1998)). This example shows the formation of a new material without the possibility for reversal. However it is well known that molecular recognition can be used to form a transient luminescent species that can be reverted back to the non-luminescent material (see the following recent reference in the literature *J. Mater. Chem.,* 8 (6), 1379–1384, (1998)). For completion it is also acknowledged that a luminescent material could be converted to a non-luminescent material to for the encodement. The mechanisms by which these materials luminesce or do not luminesce and their physical attributes have been thoroughly reviewed (*Chem. Rev.,* 97, 1515–1564, (1997)). The materials and methods for generating luminescence described within this reference are useful in the practice of this invention. This invention however pertains to the use of these materials for encodement of data, in particular large data blocks, on articles.

Equation 3
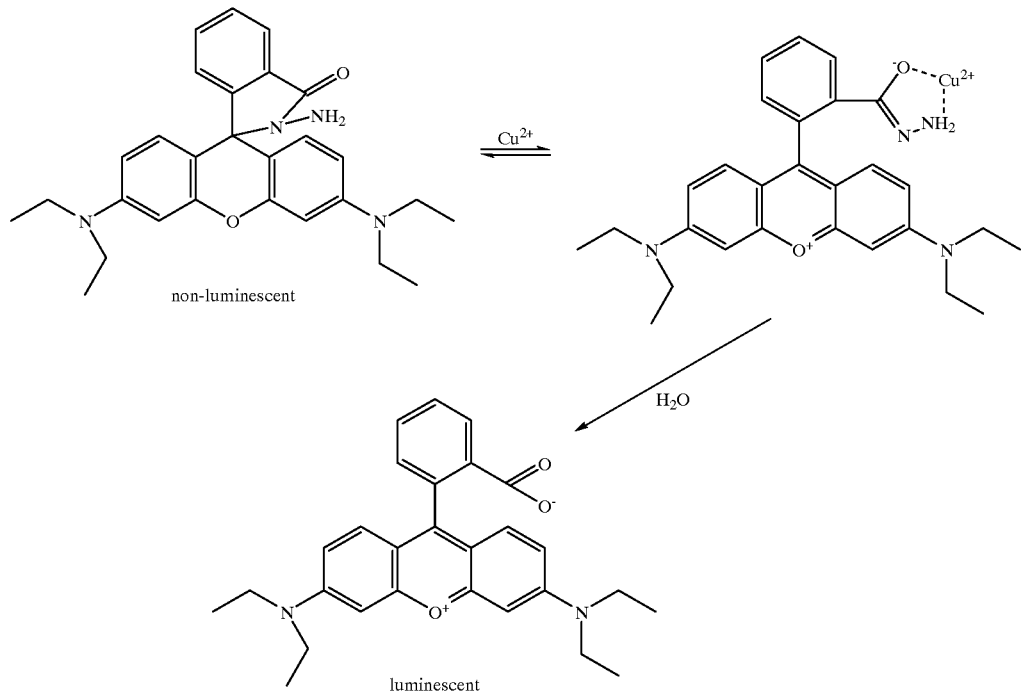
Specific materials that can be used in this invention include:
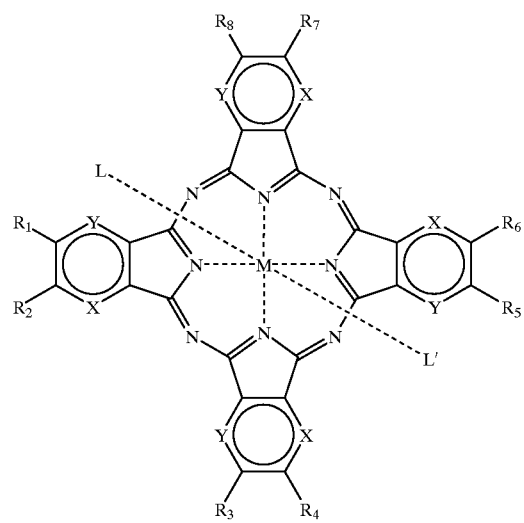
| Compound | R1 | R2 | R3 | R4 | R5 | R6 | R7 | R8 | X | Y | M | L | L' |
|---|---|---|---|---|---|---|---|---|---|---|---|---|---|
| I-1 | H | H | H | H | H | H | H | H | CH | CH | Al | Cl | — |
| I-2 | H | H | H | H | H | H | H | H | CH | CH | Al | OR$^a$ | — |
| I-3 | H | H | H | H | H | H | H | H | CH | CH | H2 | — | — |
| I-4 | H | H | H | H | H | H | H | H | CH | CH | Si | Cl | Cl |
| I-5 | H | H | H | H | H | H | H | H | CH | CH | Si | OH | OH |
| I-6 | H | H | H | H | H | H | H | H | CH | CH | Si | OR$^a$ | OR$^a$ |
| I-7 | H | H | H | H | H | H | H | H | CH | CH | Mg | — | — |

-continued

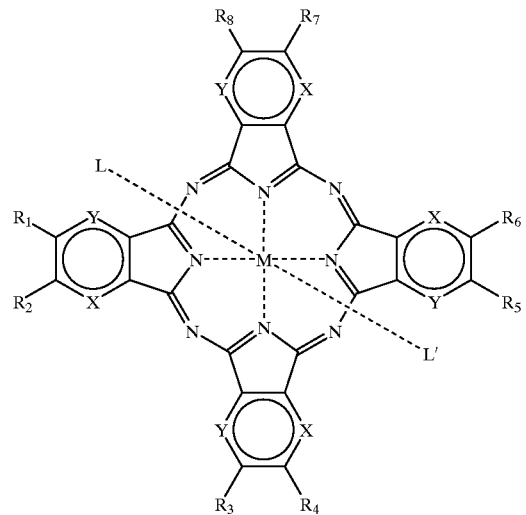

| Compound | R1 | R2 | R3 | R4 | R5 | R6 | R7 | R8 | X | Y | M | L | L' |
|---|---|---|---|---|---|---|---|---|---|---|---|---|---|
| I-8 | H | H | H | H | H | H | H | H | CH | CH | Zn | — | — |
| I-9 | H | H | H | H | H | H | H | H | CH | CH | Mn | — | — |
| I-10 | H | H | H | H | H | H | H | H | CH | CH | Eu | — | — |
| I-11 | H | H | H | H | H | H | H | H | CH | CH | Yb | — | — |
| I-12 | H | H | H | H | H | H | H | H | CH | CH | Sn | — | — |
| I-13 | H | H | H | H | H | H | H | H | NH | CH | Al | Cl | — |
| I-14 | H | H | H | H | H | H | H | H | NH | CH | Al | OR$^a$ | — |
| I-15 | H | H | H | H | H | H | H | H | NH | CH | H2 | — | — |
| I-16 | H | H | H | H | H | H | H | H | NH | CH | Si | Cl | Cl |
| I-17 | H | H | H | H | H | H | H | H | NH | CH | Si | OH | OH |
| I-18 | H | H | H | H | H | H | H | H | NH | CH | Si | OR$^a$ | OR$^a$ |
| I-19 | H | H | H | H | H | H | H | H | NH | CH | Mg | — | — |
| I-20 | H | H | H | H | H | H | H | H | NH | CH | Zn | — | — |
| I-21 | H | H | H | H | H | H | H | H | NH | CH | Mn | — | — |
| I-22 | H | H | H | H | H | H | H | H | NH | CH | Sn | — | — |
| I-23 | H | H | H | H | H | H | H | H | NH | CH | Eu | — | — |
| I-24 | H | H | H | H | H | H | H | H | CH | CH | Yb | — | — |
| I-25 | SO$_3^-$ | H | SO$_3^-$ | H | SO$_3^-$ | H | SO$_3^-$ | H | CH | CH | Al | Cl | — |
| I-26 | SO$_3^-$ | H | SO$_3^-$ | H | SO$_3^-$ | H | SO$_3^-$ | H | CH | CH | Al | OR$^a$ | — |
| I-27 | SO$_3^-$ | H | SO$_3^-$ | H | SO$_3^-$ | H | SO$_3^-$ | H | CH | CH | H2 | — | — |
| I-28 | SO$_3^-$ | H | SO$_3^-$ | H | SO$_3^-$ | H | SO$_3^-$ | H | CH | CH | Si | Cl | Cl |
| I-29 | SO$_3^-$ | H | SO$_3^-$ | H | SO$_3^-$ | H | SO$_3^-$ | H | CH | CH | Si | OH | OH |
| I-30 | SO$_3^-$ | H | SO$_3^-$ | H | SO$_3^-$ | H | SO$_3^-$ | H | CH | CH | Si | OR$^a$ | OR$^a$ |
| I-31 | SO$_3^-$ | H | SO$_3^-$ | H | SO$_3^-$ | H | SO$_3^-$ | H | CH | CH | Mg | — | — |
| I-32 | SO$_3^-$ | H | SO$_3^-$ | H | SO$_3^-$ | H | SO$_3^-$ | H | CH | CH | Zn | — | — |
| I-33 | SO$_3^-$ | H | SO$_3^-$ | H | SO$_3^-$ | H | SO$_3^-$ | H | CH | CH | Mn | — | — |
| I-34 | SO$_3^-$ | H | SO$_3^-$ | H | SO$_3^-$ | H | SO$_3^-$ | H | CH | CH | Eu | — | — |
| I-35 | SO$_3^-$ | H | SO$_3^-$ | H | SO$_3^-$ | H | SO$_3^-$ | H | CH | CH | Sn | — | — |
| I-36 | SO$_3^-$ | H | SO$_3^-$ | H | SO$_3^-$ | H | SO$_3^-$ | H | CH | CH | Yb | — | — |
| I-37 | t-butyl | H | t-butyl | H | t-butyl | H | t-butyl | H | CH | CH | Al | Cl | — |
| I-38 | t-butyl | H | t-butyl | H | t-butyl | H | t-butyl | H | CH | CH | H2 | — | — |
| I-39 | t-butyl | H | t-butyl | H | t-butyl | H | t-butyl | H | CH | CH | Al | OR$^a$ | — |
| I-40 | t-butyl | H | t-butyl | H | t-butyl | H | t-butyl | H | CH | CH | Si | Cl | Cl |
| I-41 | t-butyl | H | t-butyl | H | t-butyl | H | t-butyl | H | CH | CH | Si | OH | OH |
| I-42 | t-butyl | H | t-butyl | H | t-butyl | H | t-butyl | H | CH | CH | Si | OR$^a$ | OR$^a$ |
| I-43 | t-butyl | H | t-butyl | H | t-butyl | H | t-butyl | H | CH | CH | Mg | — | — |
| I-44 | t-butyl | H | t-butyl | H | t-butyl | H | t-butyl | H | CH | CH | Zn | — | — |
| I-45 | t-butyl | H | t-butyl | H | t-butyl | H | t-butyl | H | CH | CH | Mn | — | — |
| I-46 | t-butyl | H | t-butyl | H | t-butyl | H | t-butyl | H | CH | CH | Yb | — | — |
| I-47 | t-butyl | H | t-butyl | H | t-butyl | H | t-butyl | H | CH | CH | Sn | — | — |
| I-48 | t-butyl | H | t-butyl | H | t-butyl | H | t-butyl | H | CH | CH | Eu | — | — |
| I-49 | t-butyl | H | t-butyl | H | t-butyl | H | t-butyl | H | N(Me)2 | CH | Al | Cl | Cl |
| I-50 | t-butyl | H | t-butyl | H | t-butyl | H | t-butyl | H | N(Me)2 | CH | Al | OH | OH |
| I-51 | t-butyl | H | t-butyl | H | t-butyl | H | t-butyl | H | N(Me)2 | CH | Al | OR$^a$ | OR$^a$ |
| I-52 | t-butyl | H | t-butyl | H | t-butyl | H | t-butyl | H | N(Me)2 | CH | Si | Cl | Cl |
| I-53 | t-butyl | H | t-butyl | H | t-butyl | H | t-butyl | H | N(Me)2 | CH | Si | OH | OH |
| I-54 | t-butyl | H | t-butyl | H | t-butyl | H | t-butyl | H | N(Me)2 | CH | Si | OR$^a$ | OR$^a$ |
| I-55 | t-butyl | H | t-butyl | H | t-butyl | H | t-butyl | H | N(Me)2 | CH | Mg | — | — |
| I-56 | t-butyl | H | t-butyl | H | t-butyl | H | t-butyl | H | N(Me)2 | CH | Zn | — | — |

-continued

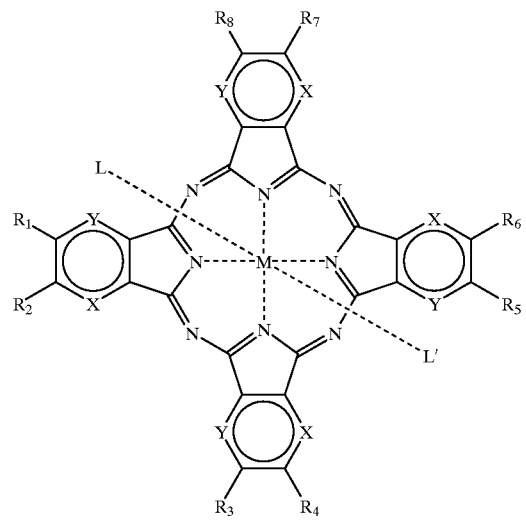

| Compound | R1 | R2 | R3 | R4 | R5 | R6 | R7 | R8 | X | Y | M | L | L' |
|---|---|---|---|---|---|---|---|---|---|---|---|---|---|
| I-57 | t-butyl | H | t-butyl | H | t-butyl | H | t-butyl | H | N(Me)2 | CH | Mn | — | — |
| I-58 | t-butyl | H | t-butyl | H | t-butyl | H | t-butyl | H | N(Me)2 | CH | Eu | — | — |
| I-59 | t-butyl | H | t-butyl | H | t-butyl | H | t-butyl | H | N(Me)2 | CH | Sn | — | — |
| I-60 | t-butyl | H | t-butyl | H | t-butyl | H | t-butyl | H | N(Me)2 | CH | Yb | — | — |

[a]R could be any substituted alkyl (methyl, ethyl, n-butyl, t-butyl, isoamyl etc . . . ), any substitute silyl group (e.g. trimethylsilane, tributylsilane, trichlorosilane, triethoxysilane, etc . . . ) or any group that could be used to make the above compounds oligomeric or prevent dye aggregation)

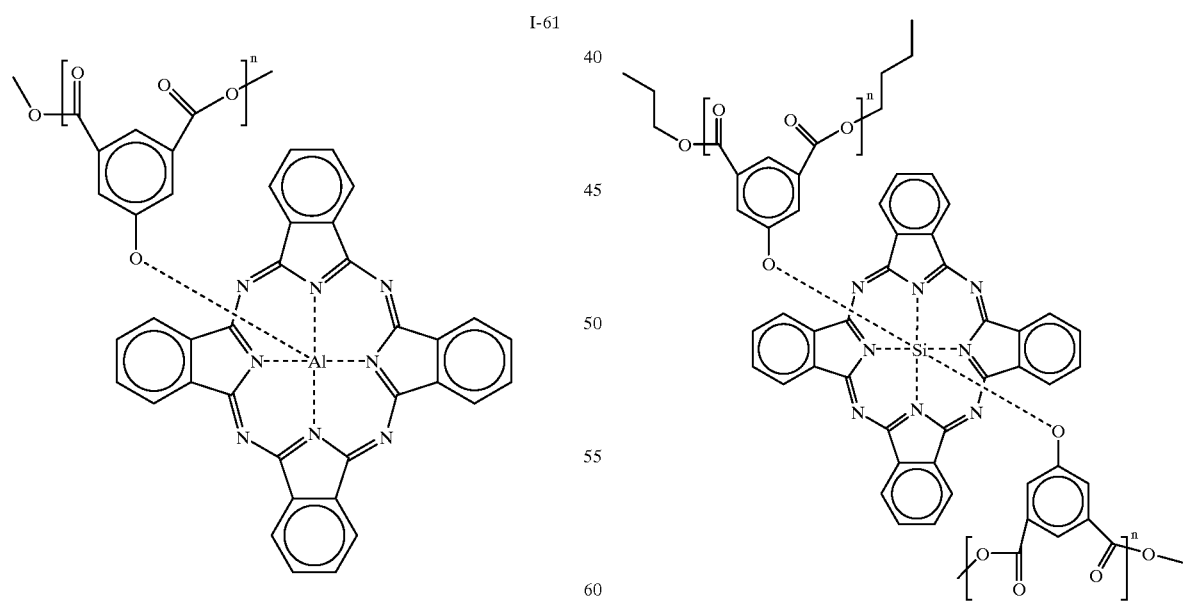

wherein n = any interger and the linkage depicts formation of any polyester wherein n = any interger and the linkage depicts formation of any polyester

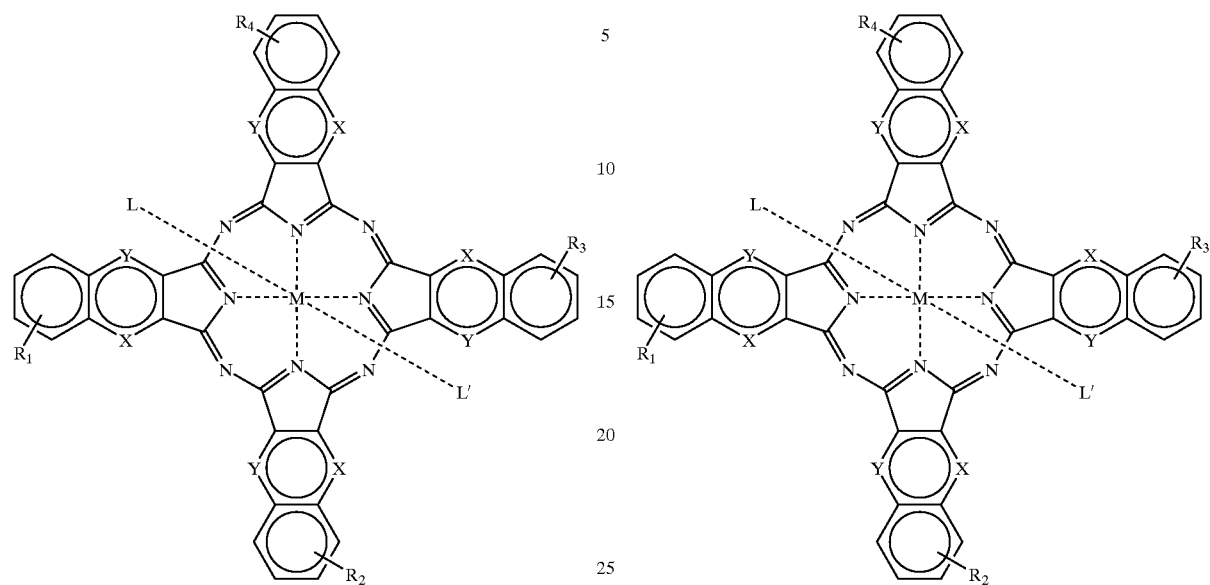

| Compound | R1 | R2 | R3 | R4 | X | Y | M | L | L' |
|---|---|---|---|---|---|---|---|---|---|
| II-1 | H | H | H | H | CH | CH | Al | Cl | — |
| II-2 | H | H | H | H | CH | CH | H2 | — | — |
| II-3 | H | H | H | H | CH | CH | Al | OR$^a$ | OR$^a$ |
| II-4 | H | H | H | H | CH | CH | Si | Cl | Cl |
| II-5 | H | H | H | H | CH | CH | Si | OH | OH |
| II-6 | H | H | H | H | CH | CH | Si | OR$^a$ | OR$^a$ |
| II-7 | H | H | H | H | CH | CH | Mg | — | — |
| II-8 | H | H | H | H | CH | CH | Zn | — | — |
| II-9 | H | H | H | H | CH | CH | Mn | — | — |
| II-10 | H | H | H | H | CH | CH | Eu | — | — |
| II-11 | H | H | H | H | CH | CH | Sn | — | — |
| II-12 | H | H | H | H | CH | CH | Yb | — | — |
| II-1 | H | H | H | H | COR | COR | Al | Cl | — |
| II-2 | H | H | H | H | COR | COR | H2 | — | — |
| II-3 | H | H | H | H | COR | COR | Al | OR$^a$ | OR$^a$ |
| II-4 | H | H | H | H | COR | COR | Si | Cl | Cl |
| II-5 | H | H | H | H | COR | COR | Si | OH | OH |
| II-6 | H | H | H | H | COR | COR | Si | OR$^a$ | OR$^a$ |
| II-7 | H | H | H | H | COR | COR | Mg | — | — |
| II-8 | H | H | H | H | COR | COR | Zn | — | — |
| II-9 | H | H | H | H | COR | COR | Mn | — | — |
| II-10 | H | H | H | H | COR | COR | Eu | — | — |
| II-11 | H | H | H | H | COR | COR | Sn | — | — |
| II-12 | H | H | H | H | COR | COR | Yb | — | — |

$^a$R could be any substituted alkyl (methyl, ethyl, n-butyl, t-butyl, isoamyl etc any substituted silyl group (e.g. trimethylsilane, tributylsilane, trichlorosilane triethoxysilane, etc . . . ) or any group that could be used to make the above compounds oligomeric or prevent dye aggregation).

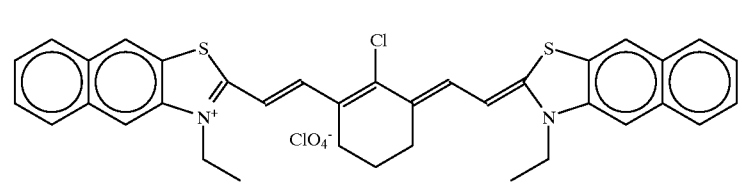

III-1

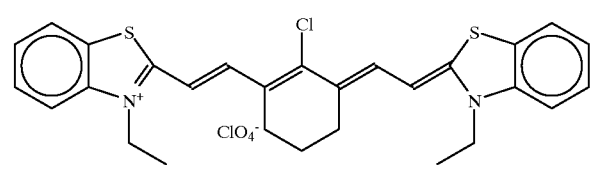

III-2

-continued
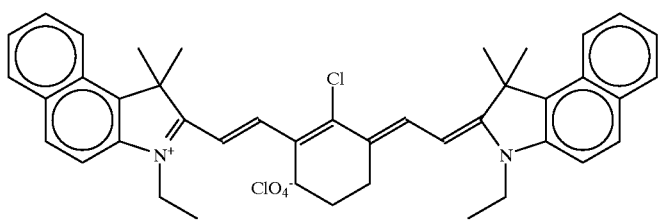
III-3
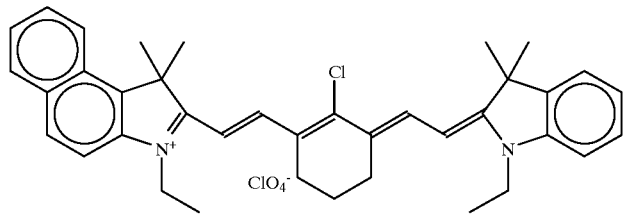
III-4
III-5
III-6
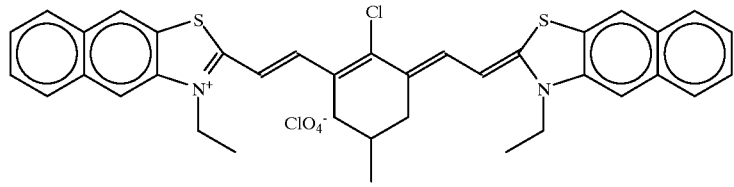
III-7
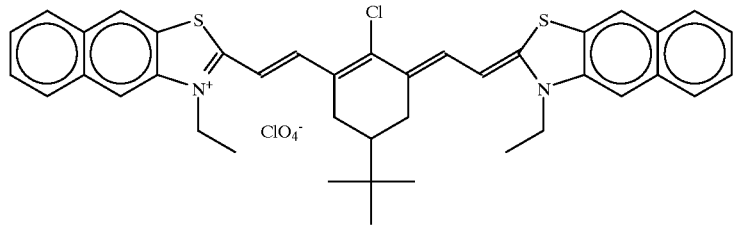
III-8
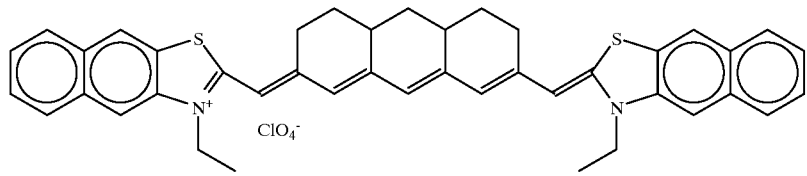
III-9

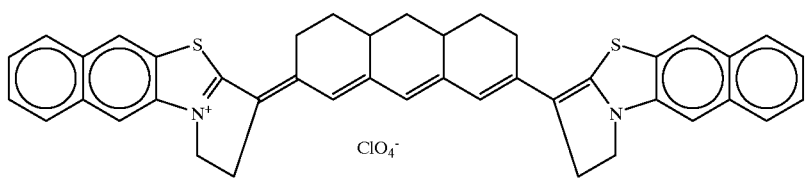
III-10
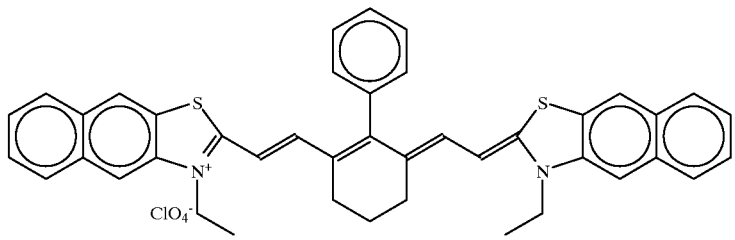
III-11
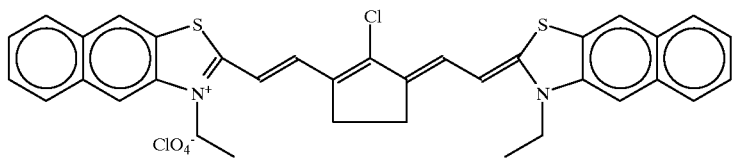
III-12
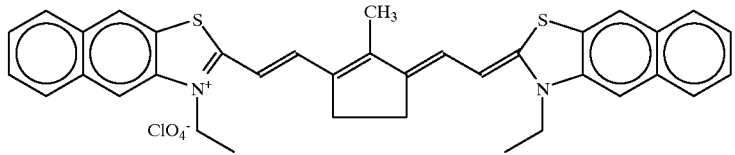
III-13
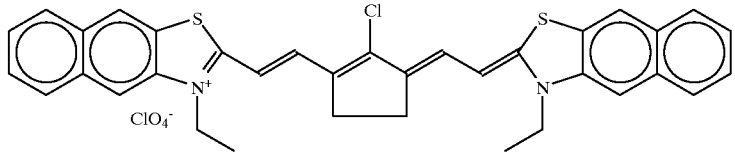
III-14
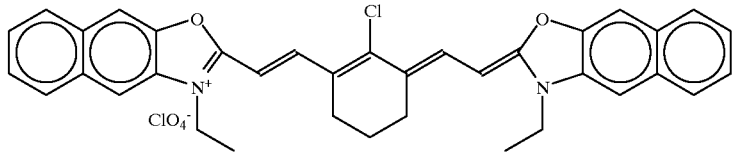
III-15
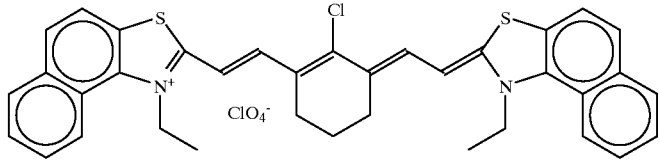
III-16
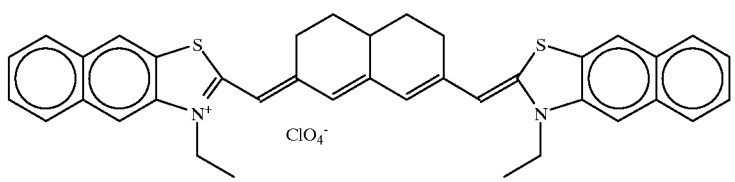
III-17

III-18
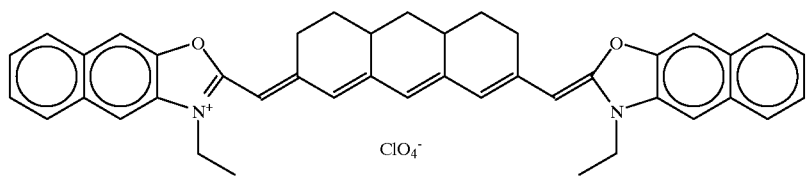
III-19
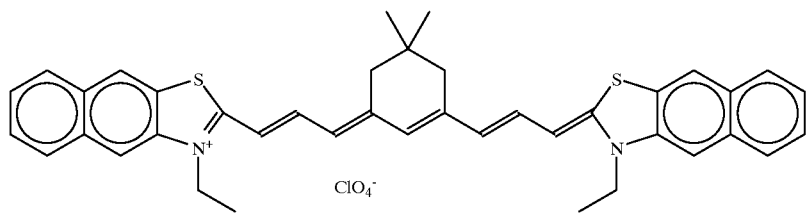
III-20
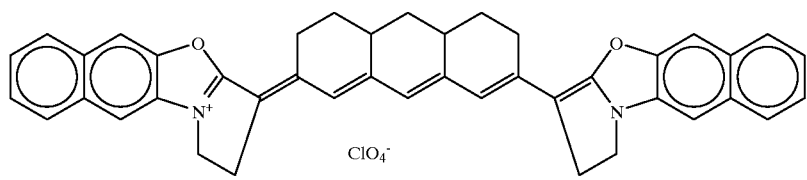
III-21
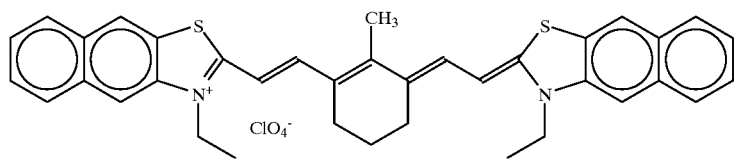
III-22
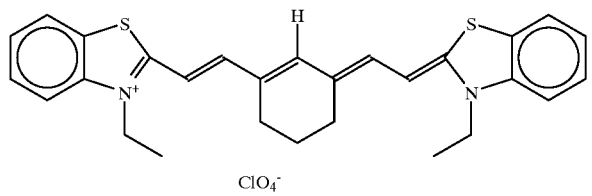
III-23
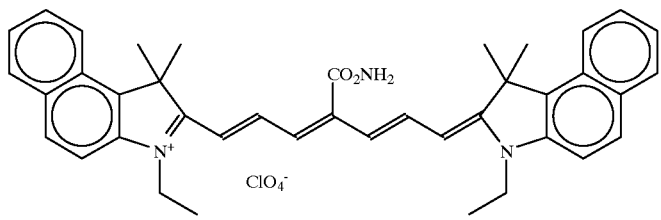
III-24
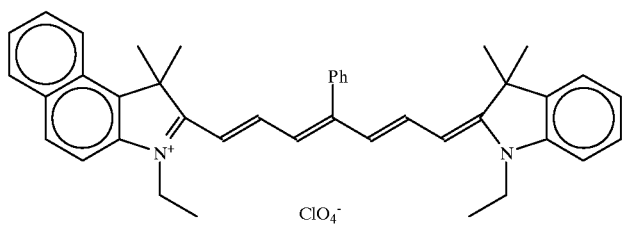

-continued
III-25
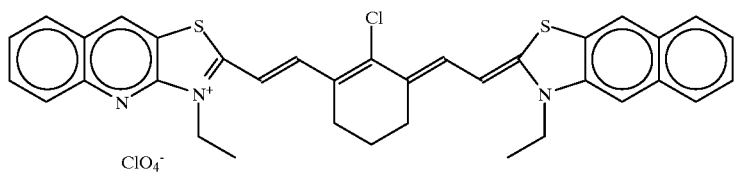
III-26
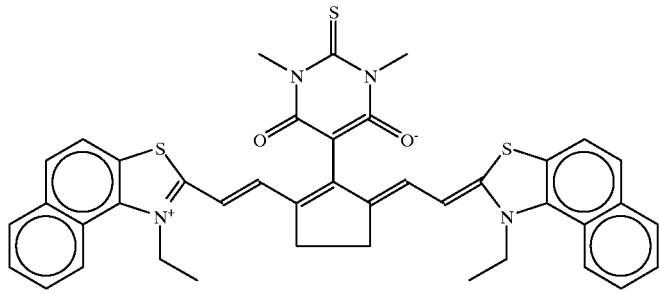
III-27
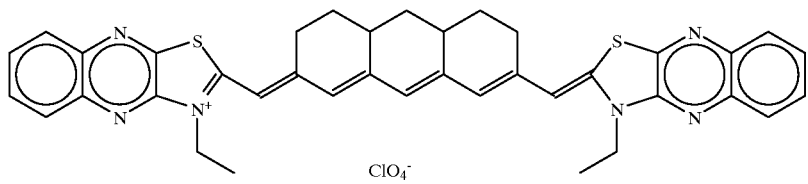
III-28
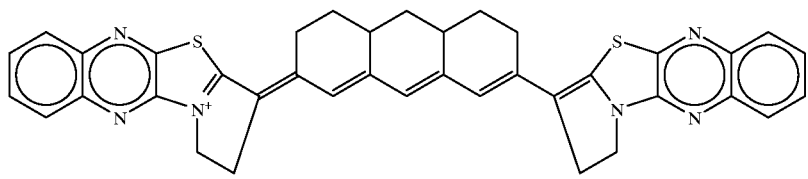
III-29
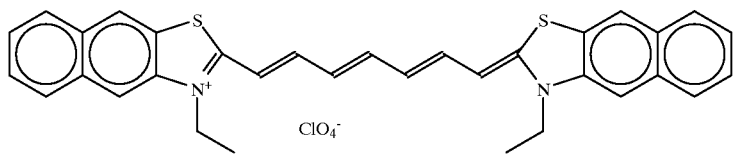
III-30
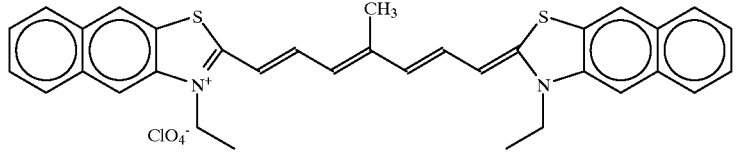
III-31
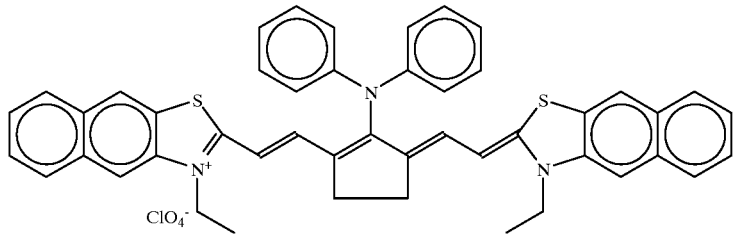

-continued
III-32
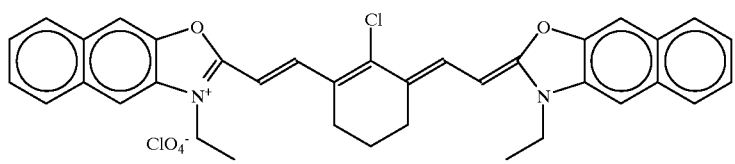
III-33
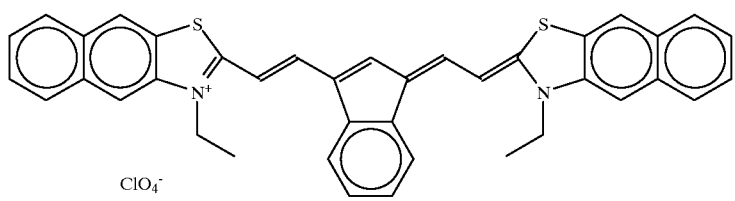
III-34
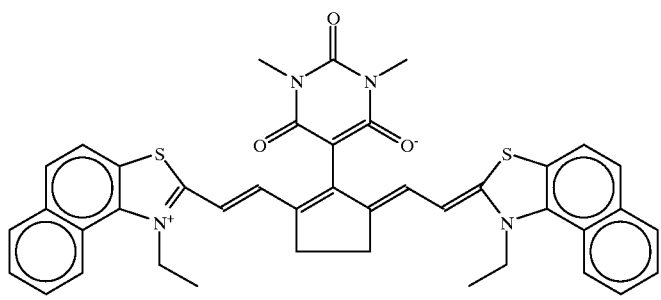
III-35
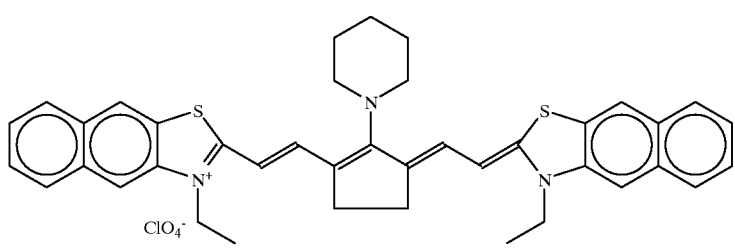
III-36
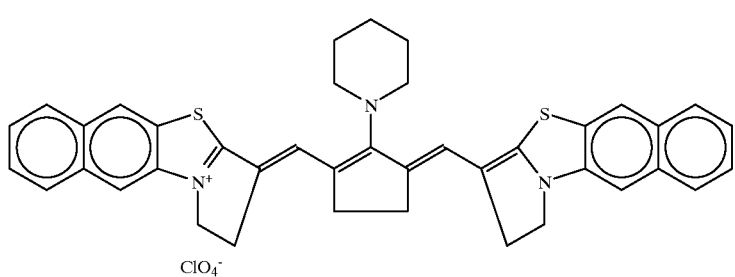
IV-1
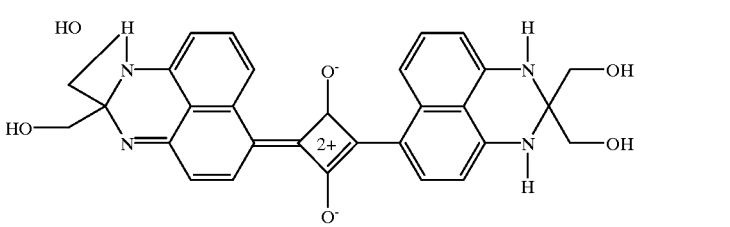
IV-2
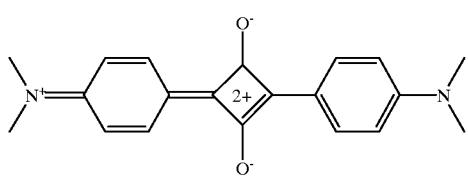

-continued
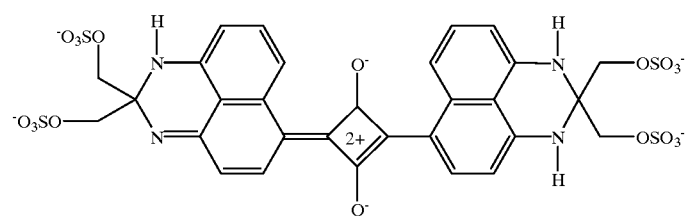
IV-3
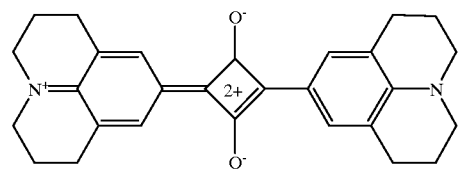
IV-4
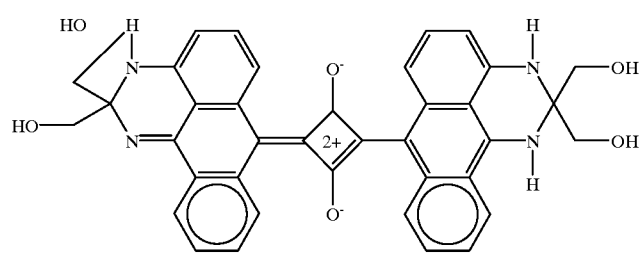
IV-5
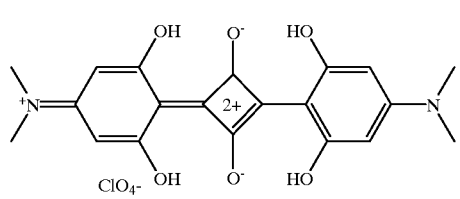
IV-6
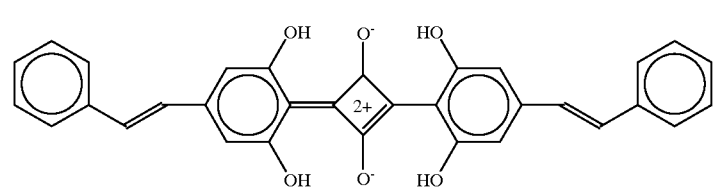
IV-7
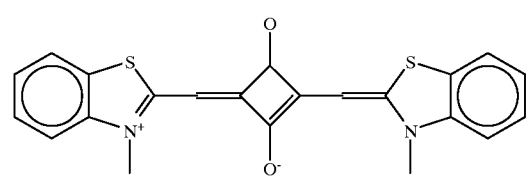
IV-8
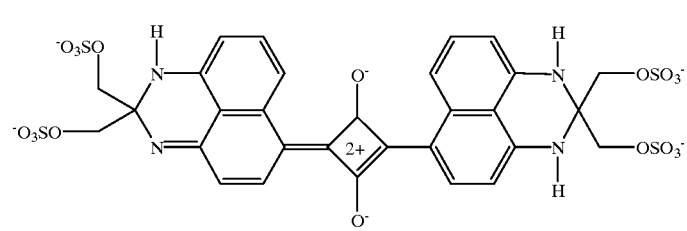
IV-9

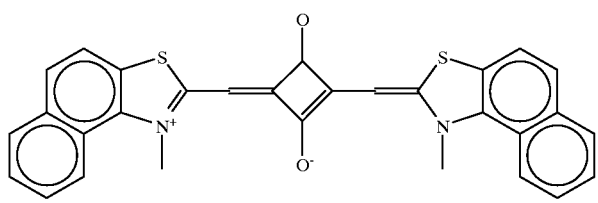
IV-10
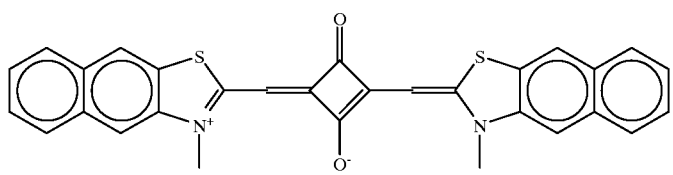
IV-11
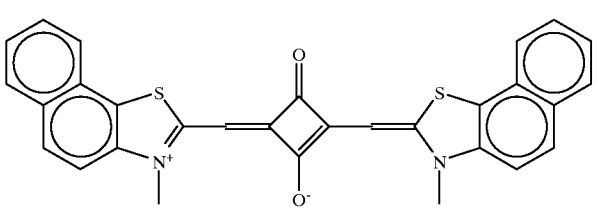
IV-12
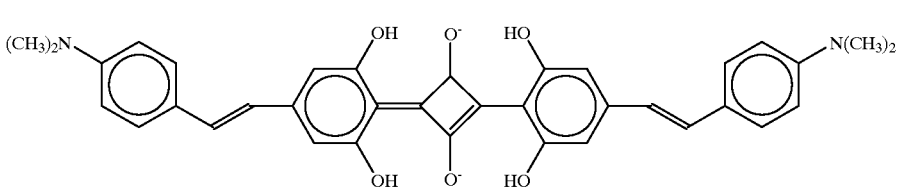
IV-13
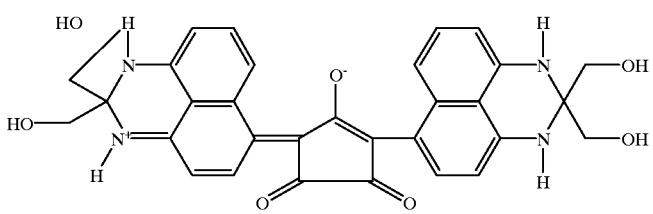
V-1
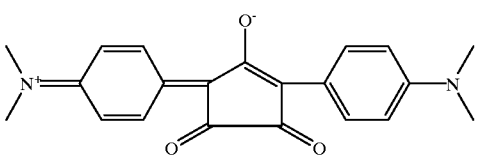
V-2
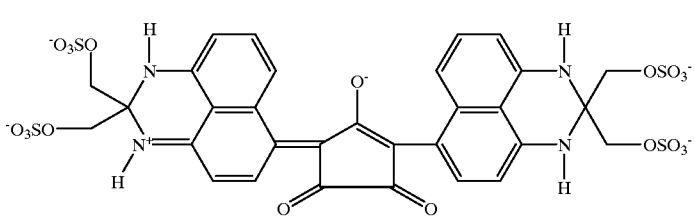
V-3
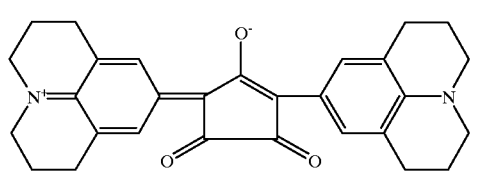
V-4

-continued
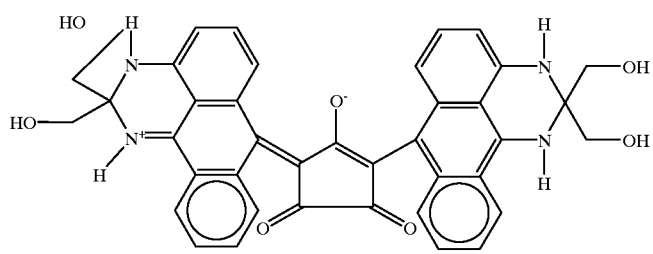
V-5
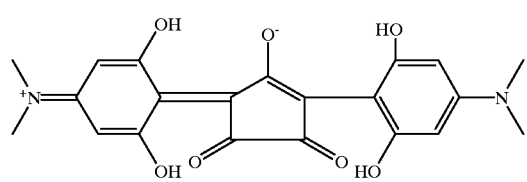
V-6
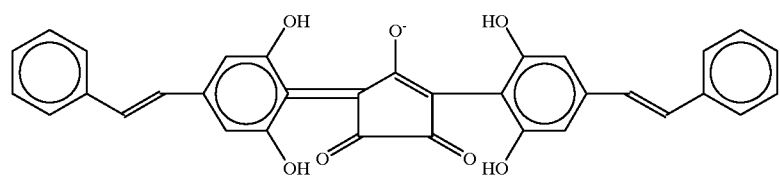
IV-7
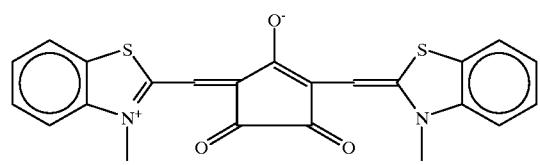
IV-8
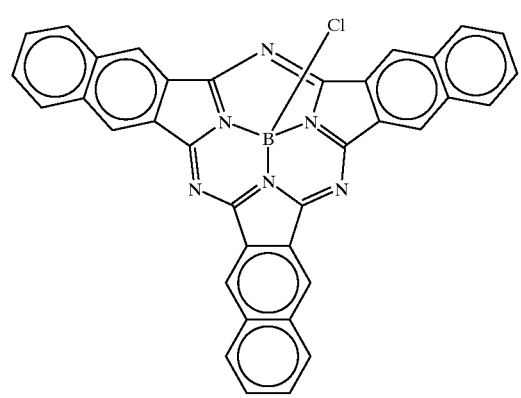
VI-1

-continued
VI-2
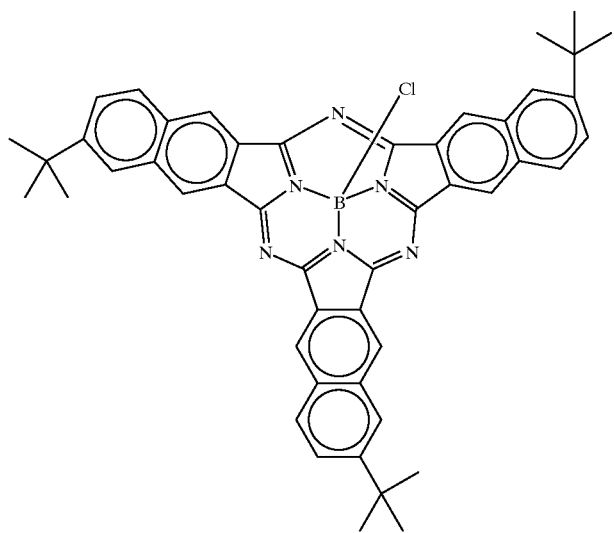
VI-3
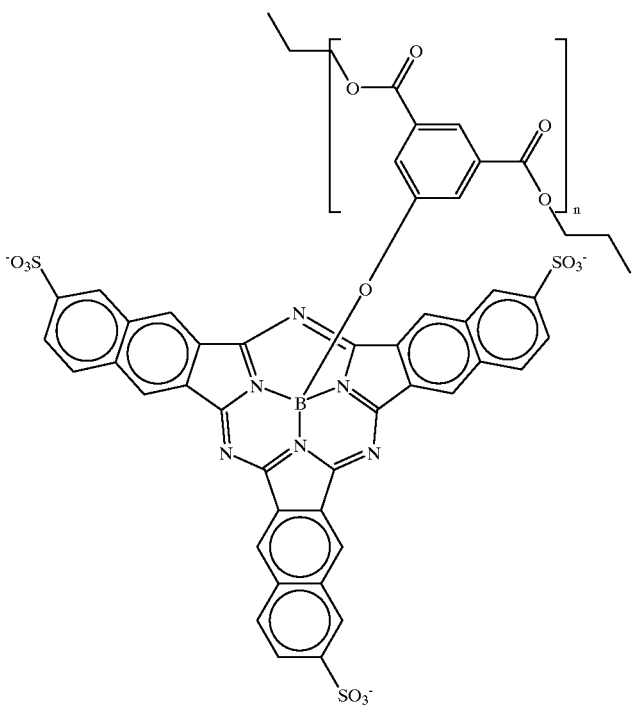

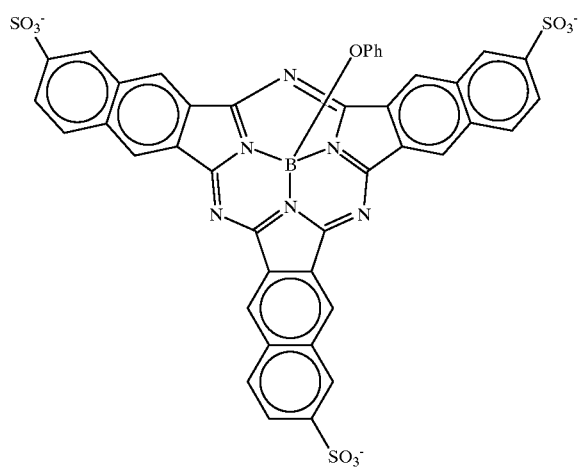
VI-4
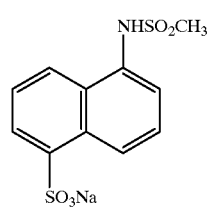
VII-1
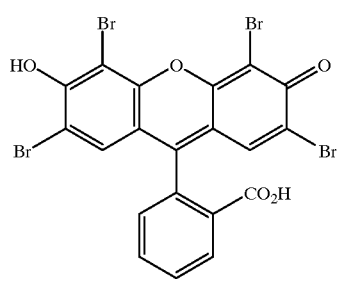
VIII-1
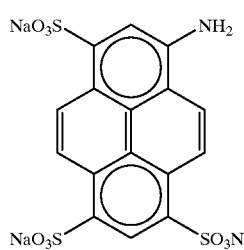
VIV-1
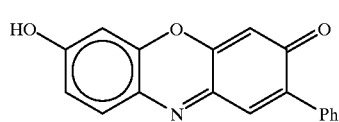
X-1
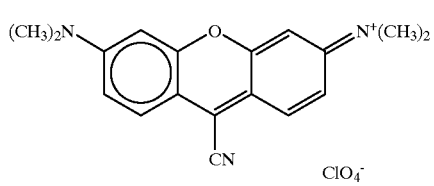
XI-1

-continued
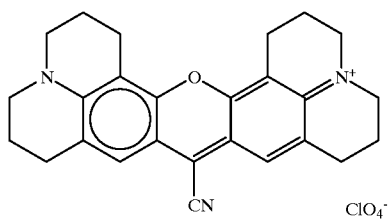
XI-2
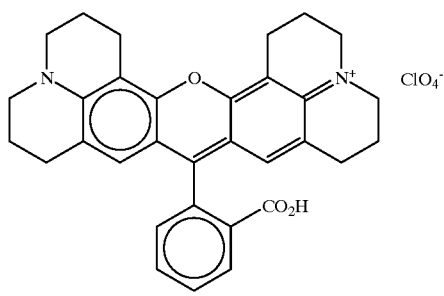
XI-3
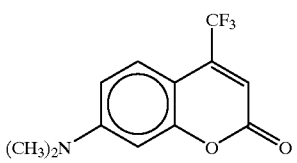
XII-1
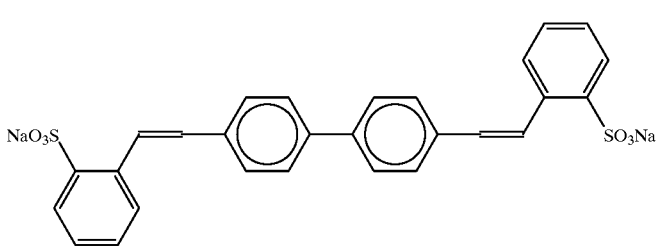
XIII-1
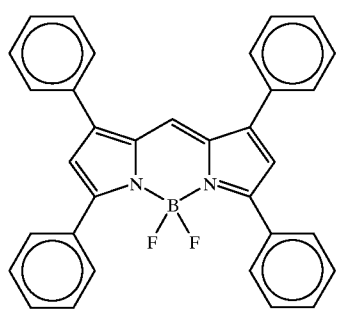
XIV-1
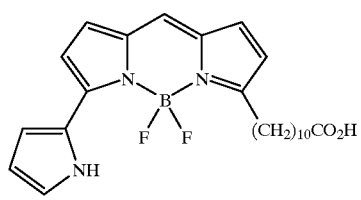
XIV-2

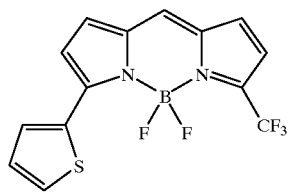 XIV-3
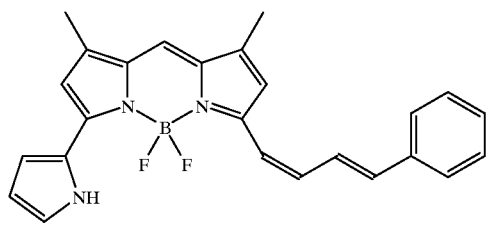 XIV-4
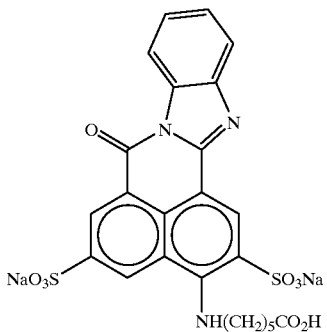 XV-1
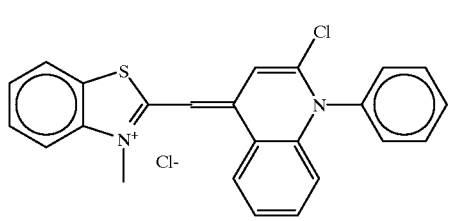 XVI-1
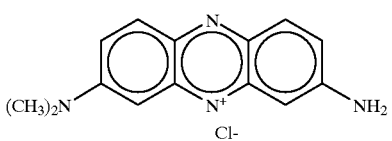 XVII-1
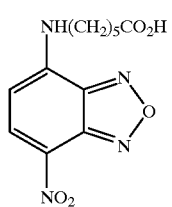 XVIII-1

-continued

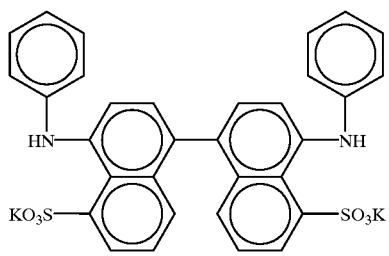

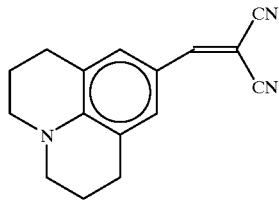

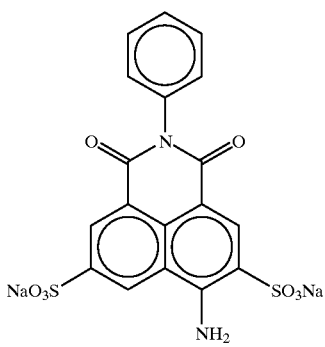

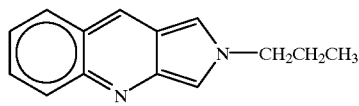

XIX-1

XX

XXI

XXII

The methods of applying the invisible material on an article can be any digital imaging mechanism, such as printing, including inkjet, direct thermal or thermal transfer printing, electrophotography, molecular recognition, thermal, or light induced chemical reaction, such as oxidant, reductant or metal complexation, of leuco dyes. Other methods include commercial color imaging systems, such as Cycolor™ system available from Cycolor Inc., 8821 Washington Church Road, Miamisburgh, Ohio 45342 and microcapsules (cyliths) containing colored dyes are selectively imagewise exposed with sequential red, green and blue light. The light initiates the hardening of the shell of the exposed bead rendering them resistant to destruction during the processing step. During the processing step the beads are compressed and the non-hardened beads are crushed releasing their colored dye which is the complimentary to the exposure color (red/cyan, green/magenta, blue/yellow). A discussion on methods of applying a material to a surface can be found in "Imaging Processes and Materials", chapter 1, Neblette's, 8$^{th}$ed., Van Nostrand Reinhold, 1989.

In the following examples inkjet and thermal dye transfer methods were chosen as the methods to apply the luminescent materials digitally on various supports.

Inkjet Method

The concentration of the invisible material in the ink solution can be 0.005%–1% by weight, preferably 0.01%–0.1% by weight. A suitable surfactant such as surfynol® 465 surfactant (an ethoxylated dialcohol surfactant sold by Air Products and Chemicals, Inc.) can be added at 0.5%–2% by weight, with the presence of 2–10% glycerol, 2–10% diethyleneglycol, 2–10% propanol, and 0%–2% triethanolamine. Commercial inkjet printers such as HP690C or Epson Stylus Color 200 was used for the testing, with the printing resolution of 300 or 360 dpi. Either stepwedge files or 2-D bar-code encoding compressed sound file can be printed digitally onto various supports at the visual reflection density of 0.01–0.3, preferably 0.05–0.1.

Thermal Dye Transfer Method

An assemblage of thermal dye transfer such as described in U.S. Pat. No. 4,839,336 can be used. This assemblage comprises: (a) a dye-donor element that contains the invisible material, (b) a dye-receiving element which is in a superposed relationship with the dye-donor element so that the dye-layer of the donor element is in contact with the dye-image receiving layer of the receiving element.

The above assemblage comprising these two elements may be pre-assembled as an integral unit when a single luminescent dye material is transferred. This can be done by temporarily adhering the two elements together at their margins. After transfer, the dye-receiving element is then peeled apart to reveal the dye transfer image.

When a luminescent image was generated on top of a three-color thermal transferred image, dye-donor elements containing cyan, yellow and magenta dyes are used similar to that disclosed in U.S. Pat. No. 4,839,336. The assemblage is formed first on three occasions during the time when heat is applied by the thermal printing head. After the first dye is transferred, the elements are peeled apart. A second dye-donor element is then brought in register with the dye-receiving element and the process repeated. The third color is obtained in the same manner to generated a three-color thermal transferred image. Finally, the dye-donor element containing the luminescent material was transferred on top of the said three-color image to form a 2D bar-code file that encodes the compressed information such as sound associated with the three-color image. More than one dye donor sheet containing different luminescent materials can also be used and multiple luminescent 2D bar-code images can be transferred consecutively.

The luminescent material in the dye-donor element is dispersed in a polymer binder such as a cellulose derivatives, e.g., cellulose acetate hydrogen phthalate, cellulose acetate propionate, cellulose acetate butyrate, cellulose triacetate or any of the materials described in U.S. Pat. No. 4,700,207. The binder may be used at a coverage of from about 0.1 to about 5 g/m$^2$, and the luminescent material can be used at a coverage of from about 0.02 to about 0.2 g/m$^2$. The support for dye-donor element in this invention can be any material that is dimensionally stable and can withstand the heat of the thermal printing heads. Such materials include polyesters such as poly(ethylene terephthalate); polyamides; polycarbonates; cellulose esters such as cellulose acetate; fluorine polymers such as polyvinylidene fluoride or poly (tetrafluoroethylene-co-hexafluoropropylene); polyethers such as polyoxymethylene,; polyacetals; polyolefins such as polystyrene, polyethylene, polypropylene or methylpentane polymers; and polymides such as polymide-amides and polyetherimides. The support generally has a thickness of from about 2 to 30 ?m. It may also be coated with a subbing layer, if desired, such as those materials described in U.S. Pat. No. 4,695,288.

The reverse side of the dye-donor element may be coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. Preferred lubricating materials include oils or semicrystalline organic solids that melt below 100° C. such as poly(vinyl stearate), beeswax, perfluorinated alkyl ester polyethers, poly (caprolactone), silicone oil, poly(tetrafluoroethylene), carbowax, poly(ethylene glycols). Suitable polymeric binders for the slipping layer include poly(vinyl alcohol-cobutyral), poly(vinyl alcohol-co-acetal), poly(styrene), poly(vinyl acetate), cellulose acetate butyrate, cellulose acetate propionate, cellulose acetate or ethyl cellulose. The amount of the lubricating is generally in the range of about 0.001 to about 2 g/m$^2$. In the presence of a polymeric binder, the lubricating material is present in the range of 0.01 to 50 weight %, preferably 0.5 to 40, of the polymer binder employed.

The dye receiving element that is used with the dye-donor element of the invention usually comprise a support having thereon a dye imaging-receiving layer. The support may be transparent film such as a poly(ether sulfone), a polymide, a cellulose ester such as cellulose acetate, a poly(vinyl alcohol-co-acetal) or a poly(ethylene terephthalate). The support for the dye receiving element may also be reflective such as baryta-coated paper, polyethylene-coated paper, white polyester (polyester with white pigment incorporated therein), an ivory paper, a condenser paper or a synthetic paper such as duPont Tyvek®. The dye-image receiving layer may comprise, for example a polycarbonate, a polyurethane, a polyester, polyvinyl chloride, poly(styrene-co-acrylonitrile), poly(carprolactone) or mixtures thereof. The dye image receiving layer may be present in the amount of about 1 to about 5 g/m$^2$.

As noted above, one of the intention of the invention are to use dye thermal transfer method to form a luminescent transfer bar-code image over a blank support or a three-colored thermal transfer image. Such a process comprise imagewise-heating a dye-donor element as described above and transferring a luminescent dye image to a dye-receiving element to form the luminescent image. The dye-donor element of the invention may used in sheet form or in a continuous roll or ribbon which may contain only the luminescent material or may have alternating areas of other image dyes such as sublimable cyan and/or magenta and/or yellow and the luminescent material. Such image dyes are disclosed in U.S. Pat. Nos. 4,541,830; 4,698,651; 4,695,287; 4,701,439, the disclosures of which are hereby incorporated by references. Thus, luminescent image (at least one) over one- two-, three- or higher number color elements are included in this invention.

Thermal printing heads which can be used to transfer dye from the dye-donor elements for the invention are available commercially. There can be employed, for example, a Fujitsu Thermal Head (FTP-040 MCSOO1), a TDK thermal head F415 HH7-1089 or a Rohm Thermal Head KE 2008-F3.

The playback device is preferably a digital hand held wand reader or a digital camera with engineered to operate in a dual role as a playback device. The sensor of this device could have integrated CCD or CMOS technology with a LED illumination source, decoding software and chips. One example of such a device would also have the mechanism to playback the file as an analog sound file. Descriptions of such devices can be found in commonly assigned copending applications 08/931,575, 09/099627, 08/959,041, 08/959, 036 and 09/099,616, the entire disclosures of which are incorporated herein by reference.

Printing of data and application of a printed transferable support in accordance with this invention is shown in the drawing. In FIG. 1A a blank sheet 1 is fed through an ink-jet printer 2 and a dot pattern 3 is printed on the sheet.

Figure 1B:
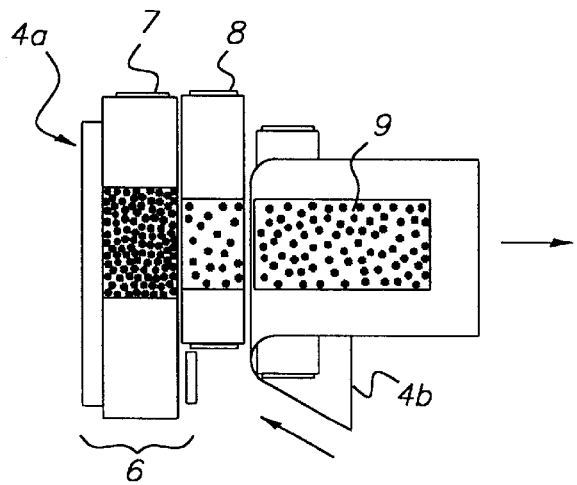
FIG. 1B is a generalized depiction of off-set printing of dot pattern on an intermediate transferable support.

In FIG. 1B, a blank sheet 4b is fed through an offset printer 4a, having an ink reservoir 6, an inking roller 7 and print roller 8. A dot pattern 9 is printed on the sheet.

Figure 2:
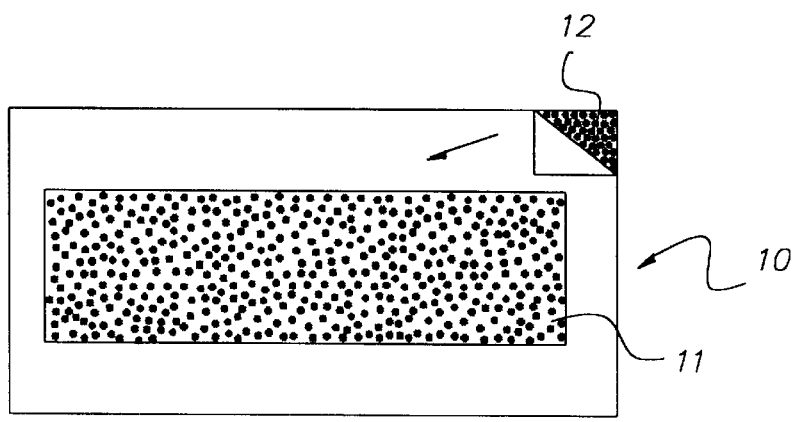
FIG. 2 shows an intermediate transferable support with an imprinted dot pattern which can be peeled off and transferred to a final article.

FIG. 2 shows a sheet 10 printed with a dot pattern 11 being peeled off a backing layer 12.

FIG. 3 shows applying a sheet 13 having a dot pattern over an entire surface thereof and adhesive layer on the opposite surface to an article 14.

The following examples illustrate the transferable support and advantages of the invention. In examples 1–4 materials used for printing visible codes on the intermediate supports were simple commercial black printing inks. The ink-jet printed codes were generated using HP deskjet (550) or Epson Stylus Color 200 type printers. The intermediate supports were commercial grade Kodak Photographic Quality paper, HP premium transparency media, or In examples 5–10 the following dyes were used:

Dye 1 polymeric aluminum phthalocyanine dye (commercially available from Eastman Chemical as NIRF ink solution).

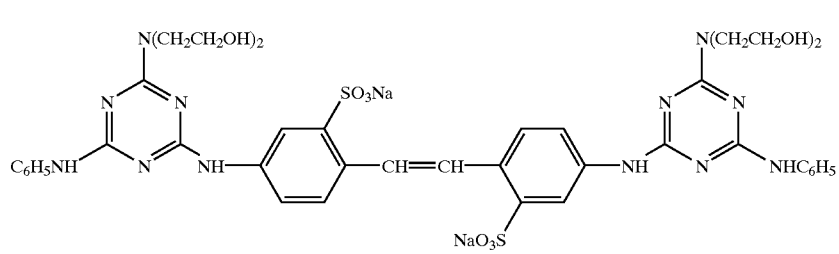
Dye 2
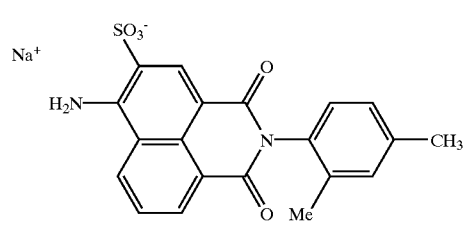
Dye 3
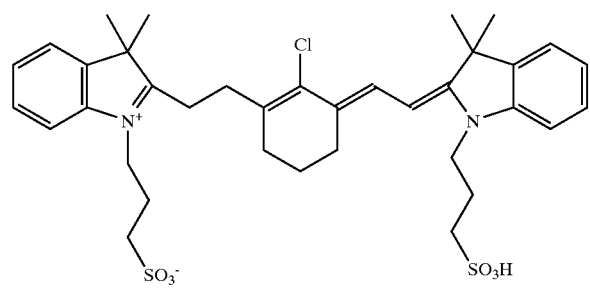
Dye 4
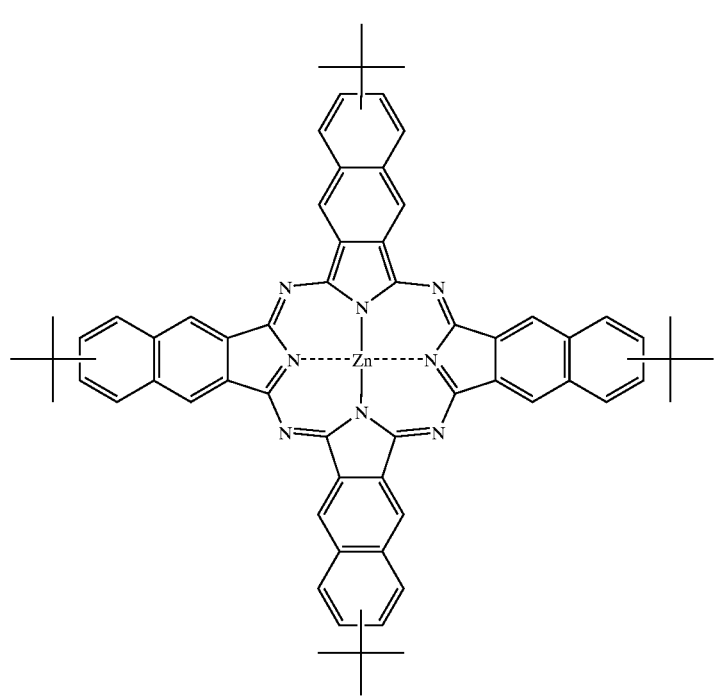
Dye 5
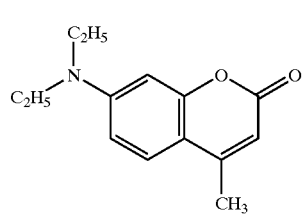
Dye 6

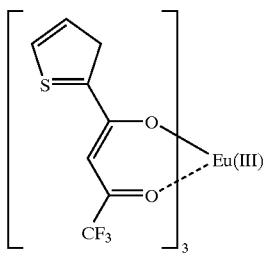

Dye 7

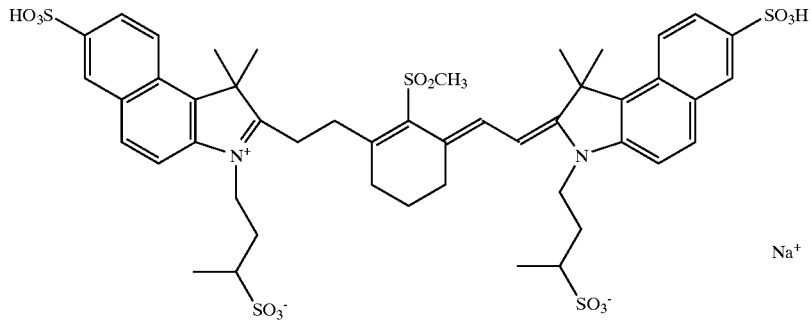

Dye 8

EXAMPLE 1

A sound file which had been previously recorded and converted to a digital "musical instrument data interface (midi)" code and then compressed using the ZIP protocol was jet printed on an intermediate sticker-type support as a 2-D barcode generated using Paperdisk software (trademark Cobblstone Software, Lexington, Mass.). The intermediate support was peeled from its backing and appended to a photograph. The data was abstracted from the print by using a Kodak Digital Science PhotoDoc Color Scanner (Eastman Kodak Company, Rochester, N.Y.), Paperdisk to reconvert the barcode to the midi file which was played back using ZCakewalk Home Studio 7, software (Twelve Tone Systems Inc., Cambridge, Mass.).

EXAMPLE 2

A sound file which had been previously recorded and converted to a digital "musical instrument data interface (midi)" code and then compressed using the ZIP protocol was jet printed on an intermediate transparent support as a 2-D barcode generated using Paperdisk software. The intermediate support was applied to a photograph using ordinary transparent tape. The data was abstracted from the print by using a Kodak photodoc scanner, Paperdisk to reconvert the barcode to the midi file which was played back using ZCakewalk Home Studio 7.

EXAMPLE 3

A invisible voice file which had been previously recorded and converted to a digital tile using Paperdisk software and was jet printed on an intermediate sticker-type. The intermediate support was applied to an upright support which was representative of a wall. The data was abstracted from the print by using the technique previously disclosed (a Kodak digital camera, Paperdisk to reconvert the barcode to the midi file which was played back using ZCakewalk Home Studio 7).

EXAMPLE 4

A data pattern was generated using Paperdisk software (trademark Cobblstone Software, Lexington, Mass.). Next the data pattern was then converted into a page of ten redundant patterns using software, commercially available as, LabelPro (trademark of Avery Dennison Corporation, Diamond Bar Calif. 91765). The page was then printed onto a sheet of clear labels media (also available from Avery Dennison Corporation as sold as Clear Shipping Labels 8663, 2"×4" type) using materials which when ink jet printed was near invisible to the naked eye. The labels (transferable support) were then applied to a final articles as follows:

a) a label with the invisible file was applied to the front surface of a three color photographic print. The underlying image was not obscured by the sticker,
b) a label with the invisible file was applied to the backside of a transparent health imaging transparent support,
c) a label with the invisible file was applied to the backside of a full color photographic print. The application of the invisible pattern was not detrimental to the normal viewing of the three color image on the opposite side of the support
d) a label with the invisible file was applied a wall,
e) a label with the invisible file was applied a computer,
f) a label with the invisible file was applied to a greeting card,
g) a label with the invisible file was applied a pane glass window,
h) a label with the invisible file was applied an photographic album intermediate sheet,
i) a label with the invisible file was applied a wax laminated photographic print,
j) a label with the invisible file was applied an inkjet print, and
k) a label with the invisible file was applied to a thermal print.

EXAMPLE 5

1.5 g of stock solution of ink containing a near-IR dye (dye 1, 0.06% by weight,) commercially available from Eastman Chemical Company as a NIRF™ ink (PM19599) was diluted with 13.5 g of solution containing surfynol® 465 (from Air Product), glycerol, diethyleneglycol, propanol and distilled water so that the final concentration of dye 1 is 0.006% by weight and 1% surfynol 465, 5% glycerol, 4% diethyleneglycol and 5% propanol. The resulted ink solution was filled into a refillable inkjet cartridge. A step image and a 2D bar-code image which represents a compressed sound file encoding 6 seconds of sound information were printed on sticker print paper with a HP 690C inkjet printer at 300 dpi resolution.

The step image was used to evaluate the dye spectroscopic characteristics such as reflection and fluorescence properties. The reflection spectra were obtained with the HP Lambda 19 UV/Vis/NIR spectrometer with an integrating sphere using an aperture mask to allow only the coated area of the paper be measured. The fluorescence spectra was obtained with a SPEX Fluo-2 fluorometer equipped with an IR detector at room temperature. The luminescent image printed was invisible to human eye under normal viewing conditions and can be transferred to other objects easily.

EXAMPLE 6

An element similar to that of Example 5 was prepared except that the fluorescent dye is a UV-absorbing, visible fluorescing dye (dye 2), and that the final concentration of dye 2 is 0.1% by weight in the ink solution. The luminescent image printed was invisible to human eye under normal viewing conditions and can be transferred to other objects easily.

EXAMPLE 7

A) An element similar to that of Example 5 was prepared except that the fluorescent dye is a visible-absorbing, visible fluorescing dye (dye 3), and that the final concentration of dye 3 is 0.01% by weight in the ink solution. The luminescent image printed was invisible to human eye under normal viewing conditions and can be transferred to other objects easily.

EXAMPLE 8

A) An element similar to that of Example 5 was prepared except that the fluorescent dye is a infrared-absorbing, infrared fluorescing dye (dye 4, a cyanine dye), and that the final concentration of dye 4 is 0.01% by weight in the ink solution. The luminescent image printed was invisible to human eye under normal viewing conditions and can be transferred to other objects easily.

EXAMPLE 9

A) An element similar to that of Example 5 was prepared except that two fluorescent inks (one contains an UV-absorbing, visible fluorescent dye, dye 2, the other contains an infrared absorbing, infrared fluorescent dye, dye 4) and that the final concentration of dye 2 and dye 4 are 0.1% and 0.01% by weight in the ink solutions, respectively. Two different luminescent 2D bar-codes (partially or completely overlap with each other) representing different compressed sound information were generated consecutively on a a sticker print paper instead of the glossy inkjet paper. The luminescent image printed was invisible to human eye under normal viewing conditions and can be transferred to other objects easily.

EXAMPLE 10

A) An element similar to that of Example 5 was prepared except that two fluorescent inks (one contains a near infrared-absorbing, near infrared fluorescent dye, dye 1, the other contains an infrared absorbing, infrared fluorescent dye, dye 4) and that the final concentration of dye 1 and dye 4 are 0.006% and 0.01% by weight, respectively, in the ink solutions. Two different luminescent 2D bar-codes (partially or completely overlap with each other) representing different compressed sound information were generated consecutively on a sticker print paper instead of the glossy inkjet paper. The luminescent image printed was invisible to human eye under normal viewing conditions and can be transferred to other objects easily.

The invention has been described in detail with particular reference to certain preferred embodiments thereof, but it will be understood that variations and modifications can be effected within the spirit and scope of the invention.

What is claimed is:

1. An object comprising a substrate bearing an image visible to the eye under normal viewing conditions, said substrate having affixed to a surface thereof a transparent sheet having on a surface thereof sensor-readable encoded data in the form of dot code or two-dimensional bar code, wherein said sensor-readable encoded data consists of material invisible to the eye under normal viewing conditions, thereby enabling unobstructed viewing of said image visible to the eye, said transparent sheet further having an adhesive on the surface opposite that having said encoded data.

2. An object in accordance with claim 1, wherein the surface of the transparent sheet bearing said adhesive is on a release sheet.

3. An object in accordance with claim 1, wherein the material is luminescent.

4. An object in accordance with claim 1, wherein the transparent sheet is a plastic sheet.

5. An object in accordance with claim 2, wherein the transparent sheet comprises gelatin.

6. An object in accordance with claim 1, wherein the image is a photographic image.

7. An object in accordance with claim 1, wherein the substrate which is a wall.

8. An object in accordance with claim 1, wherein the substrate is a glass object.

9. An object in accordance with claim 1, wherein the substrate is a ceramic object.

10. An object in accordance with claim 1, wherein the substrate is a fabric article.

11. An object in accordance with claim 1, wherein the substrate comprises a paper.

12. An object in accordance with claim 11, wherein the paper is selected from the group consisting of plain paper, inkjet paper, thermal transfer receiver paper, and photographic paper.

13. An object in accordance with claim 1, wherein the substrate comprises a transparent material.

14. An object in accordance with claim 1, wherein the encoded data comprise a data file.

15. An object in accordance with claim 14, wherein the data file comprises a digitized sound file.

16. An object according to claim 1, wherein the material comprising the encoded data absorbs or emits in the infrared (IR) region of the spectrum.

17. An object according to claim 16, wherein the material comprising the encode data absorbs light between 800 nm and 1200 nm.

18. An object according to claim 1, wherein the material comprising the encoded data absorbs in the ultraviolet (UV) or visible regions of the spectrum.

19. The object of claim 1, wherein said material comprises:

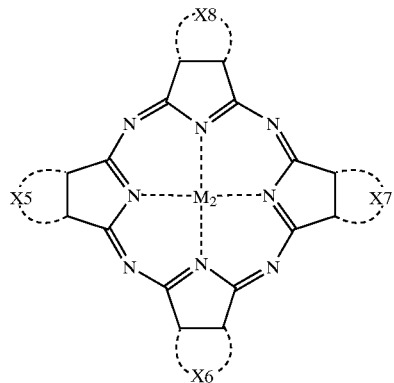

T wherein:
X5, X6, X7 and X8 independently represent atoms necessary to form a ring, wherein said ring is aromatic or heteroaromatic; and
M2 is a metal or two hydrogen atoms.

20. The object of claim 19 wherein X5, X6, X7 and X8 further independently comprise functional groups through which oligomerization can be accomplished.

21. The object of claim 19 wherein said metal further comprises axial ligands for appending additional functional groups.

22. The object of claim 1 wherein said material comprises:

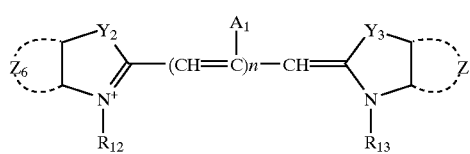

V wherein:
n is 0 or any integer;
A is a group that is appended to the central chain carbon or atom, wherein A comprises an alkyl, aromatic or heteroaromatic group;
Y2 and Y3 are independently selected from the group consisting of N, O, S, Se, and Te;
Z6 and Z7 represent atoms necessary for forming a saturated aromatic or unsaturated non-aromatic ring;
R12 or R13 represent an uncharged nitrogen substituent or a charged nitrogen substituent and counterion.

23. The object of claim 22 wherein said material further comprises a bridge ring.

24. The object of claim 1 wherein said material comprises:

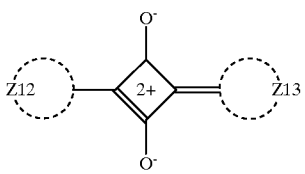

W wherein:
Z12 and Z13 independently represent any substituted aromatic or heteroaromatic nucleus.

25. The object of claim 1 wherein said material is derived by eximer fluorescence having the following equation 1:

Equation 1

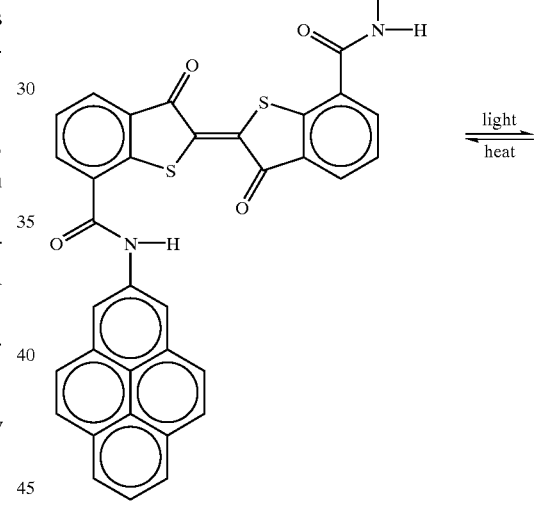

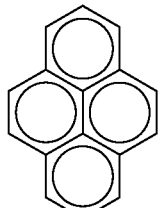
light ⇌ heat

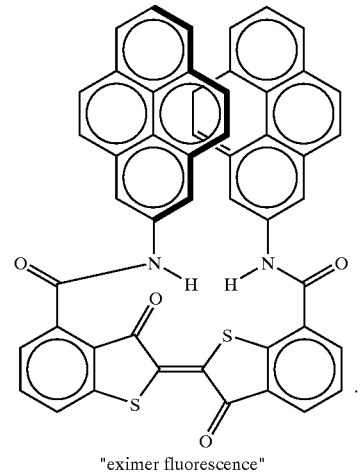

"eximer fluorescence"

26. The object of claim 1 wherein said material is derived by post-coating redox reaction having the following equation 2:

Equation 2
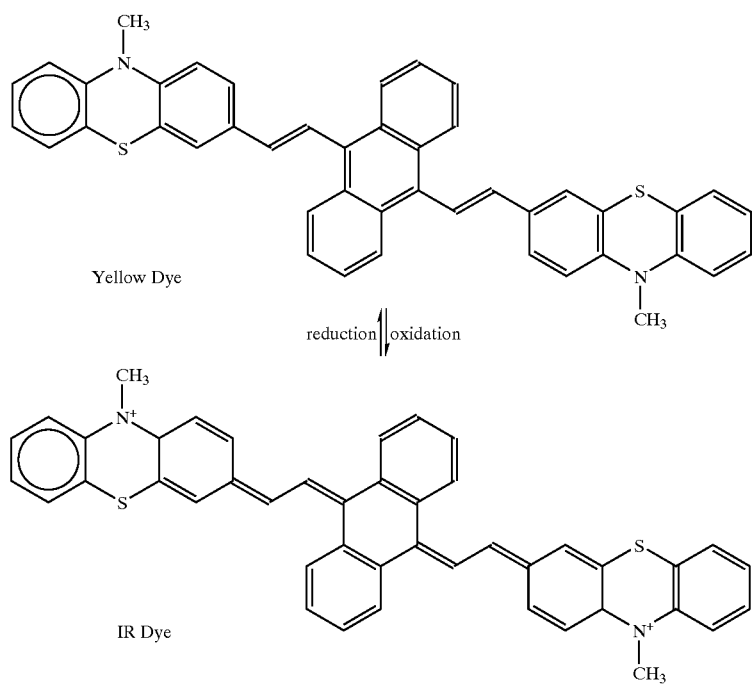
27. The object of claim 1 wherein said material is derived by selective complexation having the following equation 3:
Equation 3
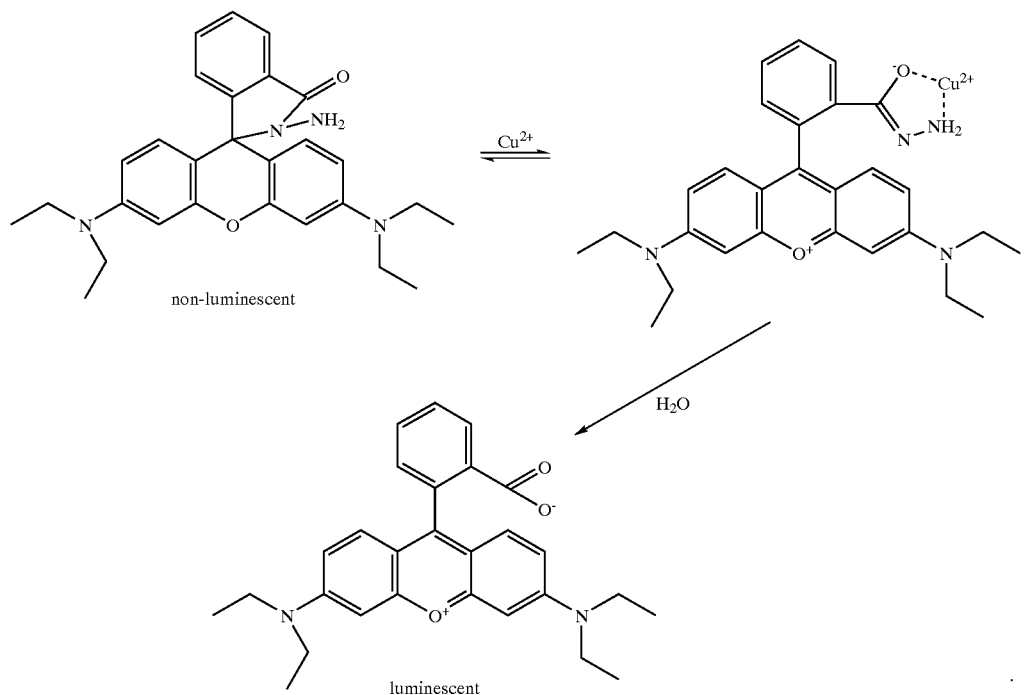
* * * * *